(12) United States Patent
Roth et al.

(10) Patent No.: US 8,907,977 B2
(45) Date of Patent: Dec. 9, 2014

(54) MOBILE TERMINAL HAVING A DISPLAY CONFIGURED TO DISPLAY MULTIPLE ZONES AND CONTROL METHOD THEREOF

(75) Inventors: Eric Roth, Seoul (KR); Hyojin Suh, Seoul (KR); Youneui Choi, Seoul (KR); Youngjun Kim, Seoul (KR); Mikyung Kim, Seoul (KR); Jaehee Chung, Yongin-si (KR)

(73) Assignee: LG Electronics Inc., Seoul (KR)

( * ) Notice: Subject to any disclaimer, the term of this patent is extended or adjusted under 35 U.S.C. 154(b) by 548 days.

(21) Appl. No.: 13/276,509

(22) Filed: Oct. 19, 2011

(65) Prior Publication Data
US 2012/0169768 A1 Jul. 5, 2012

(30) Foreign Application Priority Data
Jan. 4, 2011 (KR) ........................ 10-2011-0000477

(51) Int. Cl.
G06F 3/048 (2013.01)
G06F 3/0485 (2013.01)
G06F 3/0481 (2013.01)
G06F 3/0486 (2013.01)
G06F 3/0488 (2013.01)

(52) U.S. Cl.
CPC .... *G06F 3/0485* (2013.01); *G06F 2203/04803* (2013.01); *G06F 3/04817* (2013.01); *G06F 3/0486* (2013.01); *G06F 3/04886* (2013.01)
USPC ............ 345/619; 715/700; 715/788; 715/825

(58) Field of Classification Search
CPC ..... G06F 3/048; G06F 3/0486; G06F 3/0484; G06F 2206/1008
USPC .......... 345/619; 715/700, 765, 769, 771, 788, 715/799, 800, 825
See application file for complete search history.

(56) References Cited

U.S. PATENT DOCUMENTS

| 5,237,653 A * | 8/1993 | Noguchi et al. ............... 715/797 |
| 2005/0108655 A1* | 5/2005 | Andrea et al. ................ 715/798 |
| 2008/0034317 A1* | 2/2008 | Fard et al. ...................... 715/781 |
| 2010/0313156 A1* | 12/2010 | Louch et al. .................. 715/769 |
| 2011/0087999 A1* | 4/2011 | Bichsel et al. ................ 715/845 |

* cited by examiner

*Primary Examiner* — Michelle L Sams
(74) *Attorney, Agent, or Firm* — Ked & Associates, LLP

(57) ABSTRACT

A mobile terminal and a method for controlling the same are provided which may allow for enhanced icon and widget manipulation and use. The mobile terminal may include a display module configured to display a first zone and a second zone. The first zone may include at least one execution zone where an application is executed. The mobile terminal may also include a user input module configured to receive a command from a user, and a controller configured to control at least one icon corresponding to an application executed in the at least one execution zone.

20 Claims, 24 Drawing Sheets

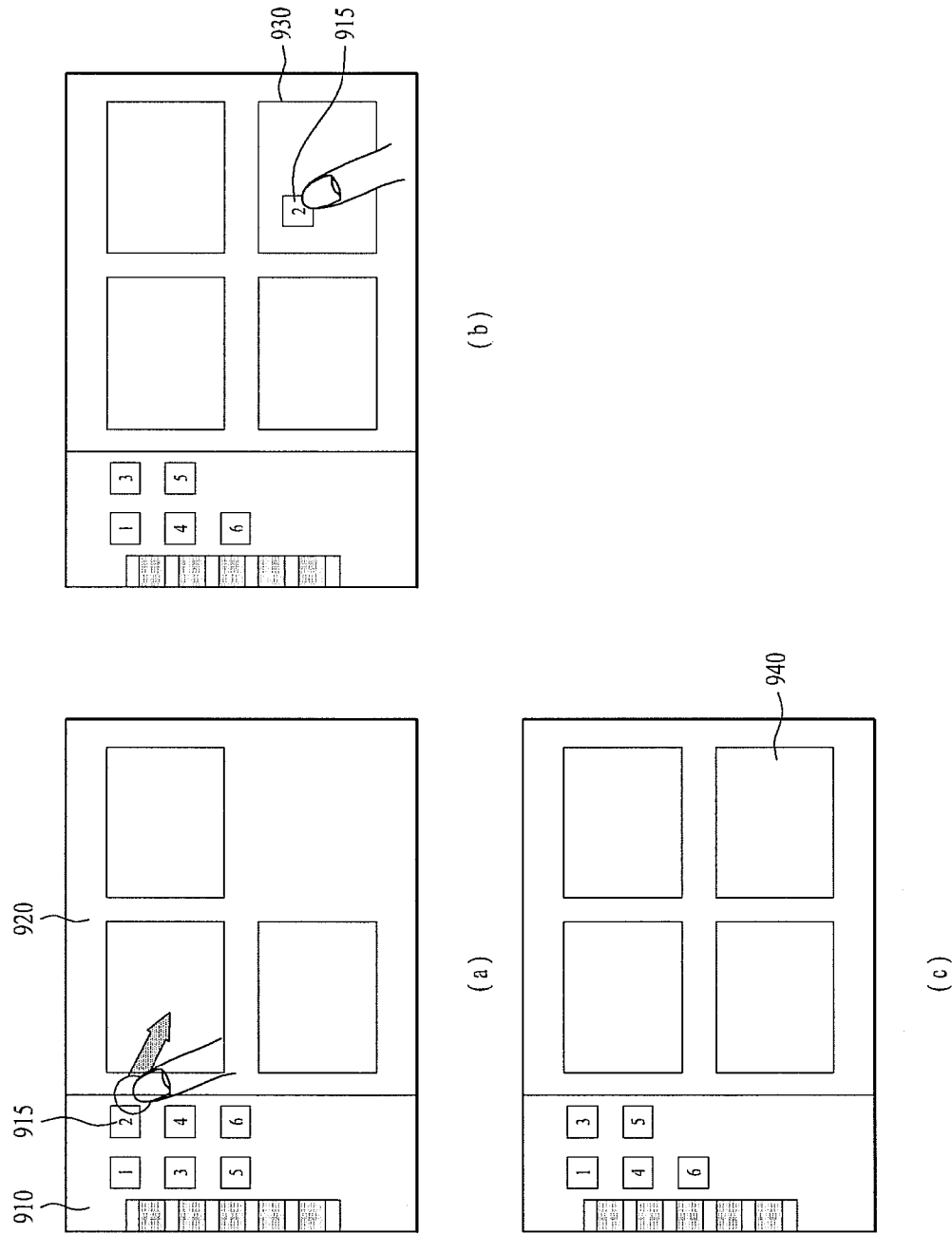

MOBILE TERMINAL HAVING A DISPLAY CONFIGURED TO DISPLAY MULTIPLE ZONES AND CONTROL METHOD THEREOF

CROSS-REFERENCE TO RELATED APPLICATION(S)

This application claims priority under 35 U.S.C. §119 to Korean Application No. 10-2011-0000477, filed in Korea on Jan. 4, 2011, whose entire disclosure is hereby incorporated by reference.

BACKGROUND

1. Field

This relates to a mobile terminal and a control method thereof.

2. Background

Terminals may be classified into mobile/portable terminals and stationary terminals depending on mobility, and into handheld terminals and mounted terminals again depending on mobility. Such terminals may take the form of a multimedia player provided with composite functions such as photographing of still or moving images, playback of music or moving picture files, game play, broadcast reception and the like. To support these types of expanded functions of the terminal, it may be advantageous to consider the structural improvements and/or software improvements.

BRIEF DESCRIPTION OF THE DRAWINGS

The embodiments will be described in detail with reference to the following drawings in which like reference numerals refer to like elements wherein:

FIG. 9 illustrates an exemplary method of adding a widget in a lens according to an embodiment as broadly described herein;

DETAILED DESCRIPTION

In the following detailed description, reference is made to the accompanying drawing figures which form a part hereof, and which show by way of illustration specific embodiments. It may be understood by those of ordinary skill in this technological field that other embodiments may be utilized, and structural, electrical, as well as procedural changes may be made without departing from the scope as broadly described herein. Wherever possible, the same reference numbers will be used throughout the drawings to refer to the same or similar parts.

As used herein, the suffixes 'module', 'unit' and 'part' may be used for elements in order to facilitate discussion. Therefore, significant meanings or roles are not applied to the suffixes themselves and it is understood that 'module', 'unit' and 'part' may be used together or interchangeably. As used herein, the term 'lens' may be used to denote an information screen, or portion(s) of a screen or series of screens displayed on a display screen of a mobile terminal as embodied and broadly described herein, and may correspond to application(s), widget(s), gadget(s) and the like.

Various types of terminals may be implemented using the various techniques discussed herein. Examples of such terminals may include mobile as well as stationary terminals, such as mobile phones, user equipment, smart phones, DTV, computers, digital broadcast terminals, personal digital assistants, portable multimedia players (PMPs), navigators, and the like. Simply for ease of discussion, further description will be provided with regard to a mobile terminal 100; however, such teachings may apply equally to other types of terminals.

Figure 1:
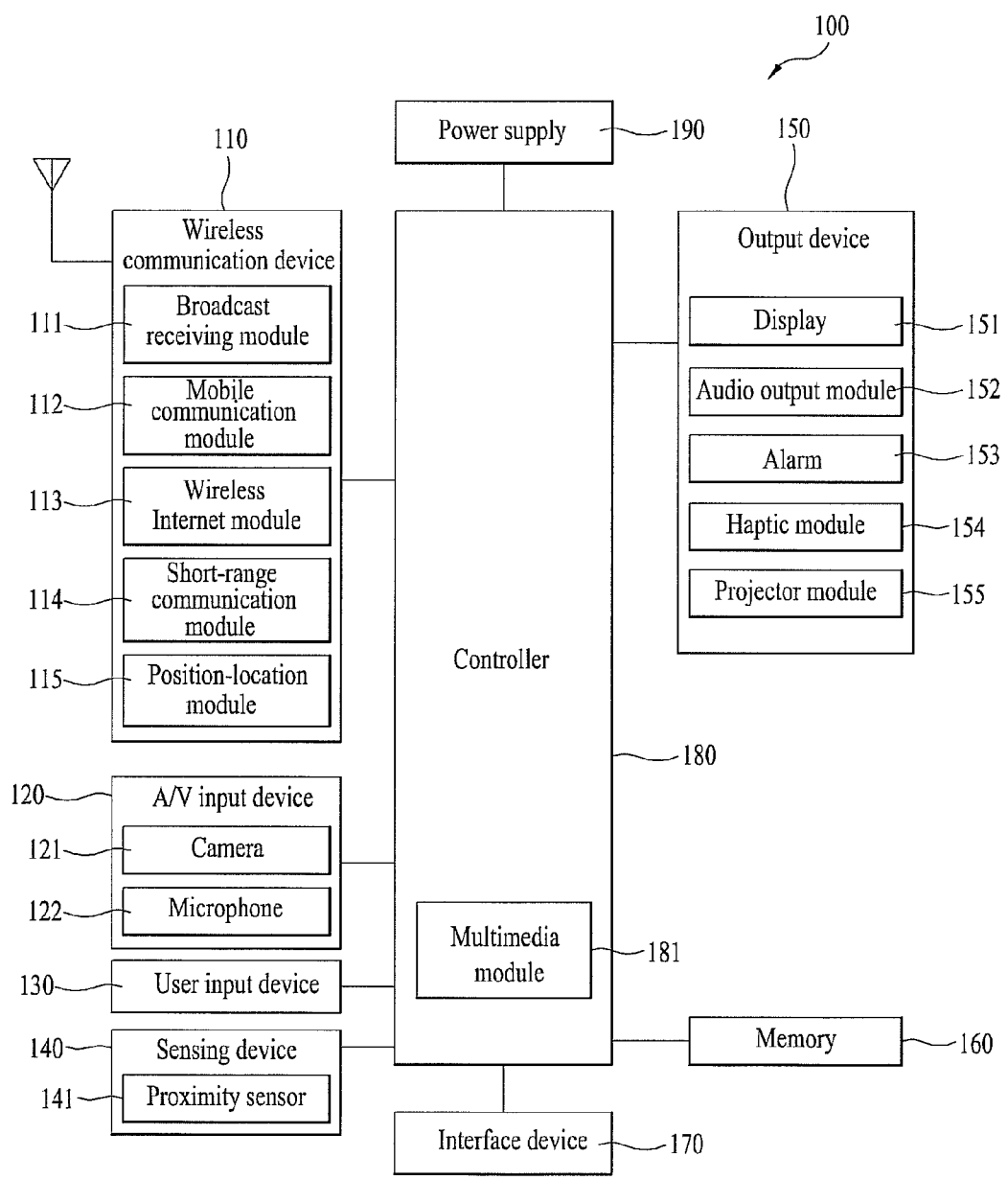
FIG. 1 is a block diagram of a mobile terminal according to one embodiment as broadly described herein.

FIG. 1 is a block diagram of a mobile terminal 100 in accordance with an embodiment as broadly described herein. The mobile terminal 100 may include a wireless communication device 110, an A/V (audio/video) input device 120, a user input device 130, a sensing device 140, an output device 150, a memory 160, an interface device 170, a controller 180, and a power supply 190, among other components. The mobile terminal 100 shown in FIG. 1 has various components, but it may be understood that greater or fewer components may alternatively be implemented.

The wireless communication device 110 may include one or more components which permit wireless communication between the mobile terminal 100 and a wireless communication system or network within which the mobile terminal 100 is located. For instance, the wireless communication device 110 may include a broadcast receiving module 111, a mobile communication module 112, a wireless internet module 113, a short-range communication module 114, a position-location module 115, and the like.

The broadcast receiving module 111 may receive a broadcast signal and/or broadcast associated information from an external broadcast managing server via a broadcast channel. The broadcast channel may include a satellite channel and a terrestrial channel. The broadcast managing server may be a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information may include information associated with a broadcast channel, a broadcast program, a broadcast service provider, etc. This broadcast associated information can also be provided via a mobile communication network. In this case, the broadcast associated information may be received by the mobile communication module 112.

The broadcast associated information may be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Alternatively, the broadcast receiving module 111 may be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 may transmit/receive wireless signals to/from one or more network entities (e.g., base station, external terminal, server, etc.). Such wireless signals may represent audio, video, and data according to text/multimedia message transceiving, among others.

The wireless internet module 113 may provide for Internet access for the mobile terminal 100. This module may be internally or externally coupled to the mobile terminal 100. In this case, the wireless Internet technology may include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 may facilitate relatively short-range communications. Suitable technologies for implementing this module may include radio frequency identification (RFID), infrared data association (IrDA), ultra-wideband (UWB), as well at the networking technologies commonly referred to as Bluetooth and ZigBee, to name a few.

The position-location module 115 may identify or otherwise obtain the location of the mobile terminal 100. If desired, this module may be implemented with a global positioning system (GPS) module.

Referring still to FIG. 1, the audio/video (NV) input device 120 may provide audio or video signal input to the mobile terminal 100. As shown, the A/V input device 120 may include a camera 121 and a microphone 122. The camera 121 may receive and process image frames of still pictures or video, which are obtained by an image sensor in a video call mode or a photographing mode. The processed image frames may be displayed on the display 151.

The image frames processed by the camera 121 may be stored in the memory 160 or may be externally transmitted via the wireless communication device 110. In certain embodiments, two or more cameras 121 may be provided to the mobile terminal 100 based on the environment in which the terminal is to be used.

The microphone 122 may receive an external audio signal while the portable device is in a particular mode, such as phone call mode, recording mode and voice recognition mode. This audio signal may be processed and converted into electric audio data. The processed audio data may be transformed into a format transmittable to a mobile communication base station via the mobile communication module 112 in case of a call mode. The microphone 122 may include assorted noise removing algorithms to remove noise generated in the course of receiving the external audio signal.

The user input device 130 may generate input data responsive to user manipulation of an associated input device or devices. Examples of such devices may include a keypad, a dome switch, a touchpad (e.g., static pressure/capacitance), a jog wheel, a jog switch, and the like.

The sensing device 140 may provide sensing signals for controlling operations of the mobile terminal 100 using status measurements of various aspects of the mobile terminal. For instance, the sensing device 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing device 140 may sense whether a sliding portion of the mobile terminal is open or closed. Other examples include the sensing device 140 sensing the presence or absence of power provided by the power supply 190, the presence or absence of a coupling or other connection between the interface device 170 and an external device. If desired, the sensing device 140 may include a proximity sensor 141.

The output device 150 may generate outputs relevant to the senses of sight, hearing, touch and the like. In some cases, the output device 150 includes the display 151, an audio output module 152, an alarm 153, a haptic module 154, a projector module 155, and the like.

The display 151 may visually display (output) information associated with the mobile terminal 100. For instance, if the mobile terminal is operating in a phone call mode, the display may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented as, for example, a liquid crystal display (LCD), a thin film transistor-liquid crystal display (TFT-LCD), an organic light-emitting diode display (OLED), a flexible display, a three-dimensional display and the like. The mobile terminal 100 may include one or more of such displays.

Some of the above displays may be a transparent or optical transmissive type, referred to as a transparent display, for example a TOLED (transparent OLED) or the like. A rear configuration of the display 151 may be the optical transmissive type as well. In this configuration, a user is able to see an object to rear of a terminal body via the area occupied by the display 151 of the terminal body.

In certain embodiments, at least two displays 151 may be provided to the mobile terminal 100. For instance, a plurality of displays may be arranged on a single face of the mobile terminal 100, spaced apart from each other or being built in one body. Alternatively, a plurality of displays may be arranged on different faces of the mobile terminal 100.

In certain embodiments, the display 151 and a sensor for detecting a touch action (hereinafter also referred to a 'touch sensor') may have a mutual layer structure (hereinafter also referred to a 'touchscreen'), so that the display 151 may serve as an input device as well as an output device. In this case, the touch sensor may be configured as a touch film, a touch sheet, a touchpad or the like.

The touch sensor may convert a pressure applied to a specific portion of the display 151 or a variation of a capacitance generated from a specific portion of the display 151 to an electric input signal. Moreover, the touch sensor may detect a pressure of a touch as well as a touched position or size.

If a touch input is made to the touch sensor, signal(s) corresponding to the touch may be transferred to a touch controller. The touch controller may process the signal(s) and then transfer the processed signal(s) to the controller 180. Therefore, the controller 180 may know whether a prescribed portion of the display 151 is touched.

With continued reference to FIG. 1, a proximity sensor 141 may be provided to an internal area of the mobile terminal 100 enclosed by the touchscreen or proximate the touchscreen. The proximity sensor may detect a presence or non-presence of an object approaching a prescribed detecting surface or an object existing around the proximity sensor using an electromagnetic field strength or infrared ray without mechanical contact. Hence, the proximity sensor may have greater durability than that of a contact type sensor and may also have greater utility than that of the contact type sensor.

The proximity sensor may include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) may be classified as a proximity sensor.

In the following description, for clarity, an action in which a pointer approaches the touchscreen without contacting with the touchscreen being recognized as located on the touchscreen is referred to as 'proximity touch' while an action in which a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor may detect a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern may be outputted to the touchscreen.

The audio output module 152 may function in various modes including a call-receiving mode, a call-placing mode, a recording mode, a voice recognition mode, a broadcast reception mode and the like to output audio data which is received from the wireless communication device 110 or is stored in the memory 160. During operation, the audio output module 152 may output audio relating to a particular function (e.g., call received, message received, etc.). The audio output module 152 may include one or more speakers, buzzers, other audio producing devices, and combinations thereof.

The alarm 153 may output a signal for announcing the occurrence of a particular event associated with the mobile terminal 100. Typical events may include a call received event, a message received event and a touch input received event. The alarm 153 may output a signal for announcing the event occurrence by way of vibration as well as video or audio signal. The video or audio signal may be outputted via the display 151 or the audio output device 152. Hence, the display 151 or the audio output module 152 may be regarded as a part of the alarm 153.

The haptic module 154 may generate various tactile effects that may be sensed by a user. For example, vibration may be one of the tactile effects generated by the haptic module 154. Strength and pattern of the vibration generated by the haptic module 154 may be controllable. For instance, different vibrations may be outputted in a manner of being synthesized together or may be outputted in sequence.

The haptic module 154 may generate various tactile effects as well as the vibration. For instance, the haptic module 154 may generate an effect attributed to an arrangement of pins vertically moving against a contact skin surface, an effect attributed to an injection/suction power of air though an injection/suction hole, an effect attributed to a skim over a skin surface, an effect attributed to contact with an electrode, an effect attributed to electrostatic force, an effect attributed to a hot/cold sense using an endothermic or exothermic device and the like.

The haptic module 154 may enable a user to sense the tactile effect through a muscle sense of finger, arm or the like as well as to transfer the tactile effect through a direct contact. In certain embodiments, at least two haptic modules 154 may be provided to the mobile terminal 100 in accordance with the corresponding configuration type of the mobile terminal 100.

The projector module 155 may perform an image projector function using the mobile terminal 100. The projector module 155 may display an image, which is identical to or partially different from the image displayed on the display 151, on an external screen or wall according to a control signal of the controller 180.

The projector module 155 may include a light source generating light (e.g., laser) for projecting an image externally, an image producing element for producing an image to output externally using the light generated from the light source, and a lens for enlarging the image for output externally at a predetermined focus distance. The projector module 155 may also include a device for adjusting an image projection direction by mechanically moving the lens or the whole module.

The projector module 155 may be classified into a CRT (cathode ray tube) module, an LCD (liquid crystal display) module, a DLP (digital light processing) module or the like according to a device type of a display means. In particular, the DLP module may enable light generated from the light source to reflect on a DMD (digital micro-mirror device) chip and may be advantageous for the downsizing of the projector module 151.

In certain embodiments, the projector module 155 may be provided in a length direction of a lateral, front or backside direction of the mobile terminal 100. However, the projector module 155 may be provided at any portion of the mobile terminal 100 and at any orientation according to the necessity thereof.

The memory 160 may store various types of data to support the processing, control, and storage requirements of the mobile terminal 100. Examples of such data may include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) may be stored in the memory 160. Moreover, data for various patterns of vibration and/or sound outputted in case of a touch input to the touchscreen may be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 may operate in association with a web storage for performing a storage function of the memory 160 on the Internet.

The interface device 170 may couple the mobile terminal 100 with external devices. The interface device 170 may receive data from the external devices or may be supplied with power and then transfer the data or power to the respective elements of the mobile terminal 100 or enable data within the mobile terminal 100 to be transferred to the external devices. The interface device 170 may be configured using a wired/wireless headset port, an external charger port, a wired/wireless data port, a memory card port, a port for coupling to a device having an identity module, audio input/output ports, video input/output ports, an earphone port and/or the like.

The identity module may be a chip for storing various kinds of information for authenticating a use authority of the mobile terminal 100 and may include User Identify Module (UIM), Subscriber Identity Module (SIM), Universal Subscriber Identity Module (USIM) and/or the like. A device having the identity module (hereinafter called 'identity device') may be manufactured as a smart card. Therefore, the identity device may be connectible to the mobile terminal 100 via the corresponding port.

When the mobile terminal 110 is connected to an external cradle, the interface device 170 may become a passage for supplying the mobile terminal 100 with power from the cradle or a passage for delivering various command signals inputted from the cradle by a user to the mobile terminal 100. Each of the various command signals inputted from the cradle or the power may operate as a signal enabling the mobile terminal 100 to recognize that it is correctly loaded in the cradle.

The controller 180 may control the overall operations of the mobile terminal 100. For example, the controller 180 may perform the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 may perform a pattern recognizing process for recognizing a writing input and a picture drawing input carried out on the touchscreen as characters or images, respectively.

The power supply 190 may provide power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such features may also be implemented by the controller 180.

For a software implementation, the embodiments described herein may be implemented with separate software modules, such as procedures and functions, each of which perform one or more of the functions and operations described herein. The software codes may be implemented with a software application written in any suitable programming language and may be stored in memory such as the memory 160, and executed by a controller or processor, such as the controller 180.

Figure 2:
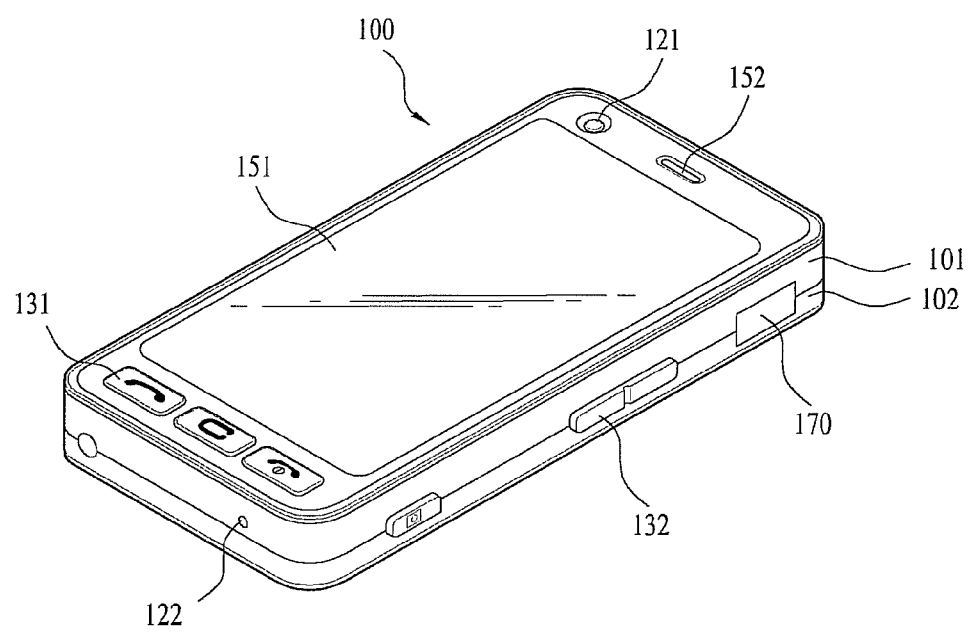
FIG. 2 is a front perspective view of a mobile terminal according to one embodiment as broadly described herein.

FIG. 2 is a front perspective diagram of a mobile terminal according to various embodiments as broadly described herein. The mobile terminal 100 shown in FIG. 2 is a bar type terminal body, but the mobile terminal may be a folder-type, slide-type, rotational-type, swing-type, combinations thereof, and the like. For clarity and ease of discussion, further disclosure will primarily relate to a bar-type mobile terminal 100, but such teachings may apply equally to other types of mobile terminals.

Referring still to FIG. 2, the mobile terminal 100 may include a case (casing, housing, cover, etc.) configuring an exterior thereof. The case may be divided into a front case 101 and a rear case 102. Various electric/electronic parts may be positioned or otherwise located in a space or cavity provided between the front and rear cases 101 and 102. In certain embodiments, at least one middle case may be provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output device 152, a camera 121, user input device 130/131 and 132, a microphone 122, an interface 170 and the like may be provided to the terminal body, and more particularly, to the front case 101.

The display 151 shown in FIG. 2 occupies the majority of a main face of the front case 101. The audio output device 152 and the camera 121 are provided to an area adjacent to one of both end portions of the display 151, while the user input device 131 and the microphone 122 are provided to another area adjacent to the other end portion of the display 151. The user input device 132 and the interface 170 may be provided to lateral sides of the front and rear cases 101 and 102.

The input device 130 is manipulated to receive a command for controlling an operation of the terminal 100. The input device 130 may include a plurality of manipulating devices 131 and 132. The manipulating devices 131 and 132 may be referred to herein as a manipulating portion and may implement any mechanism of a tactile manner that enables a user to perform a manipulation action by experiencing a tactile feeling.

Content received at the first or second manipulating device 131 or 132 may be diversely set. For instance, such a command as start, end, scroll and the like may be input at the first manipulating device 131. A command for volume adjustment of sound outputted from the audio output device 152, a command for switching to a touch recognizing mode of the display 151 or the like may be inputted at the second manipulating device 132.

Interconnected operational mechanisms between the display 151 and the touchpad 135 will be explained with reference to FIG. 3 as follows.

Figure 3:
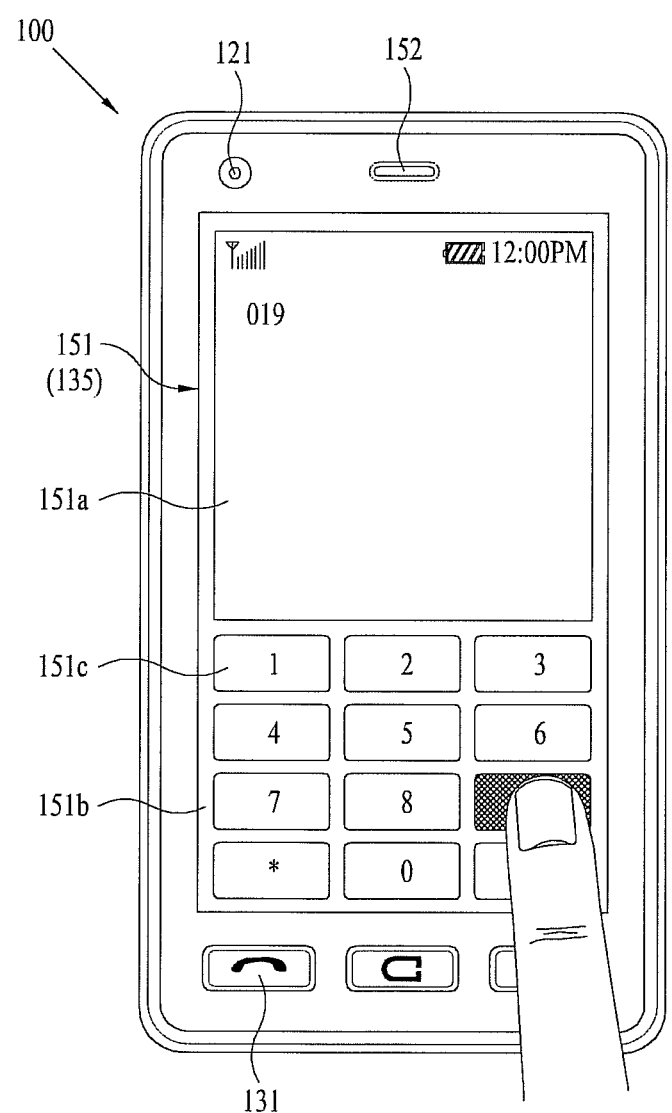
FIG. 3 is a front view of an operation state of a mobile terminal according to an embodiment as broadly described herein.

Various kinds of visual information may be displayed on the display 151 of the terminal 100 shown in FIG. 3. Such information may be displayed in characters, numerals, symbols, graphics, icons and the like. In order to input the information, at least one of the characters, numerals, symbols, graphics and icons may be represented as a single predetermined array to be implemented in a keypad formation. This keypad formation may be referred to as 'soft keys'.

In the terminal 100 shown in FIG. 3, a touch including a soft key pad is provided on a front face of a terminal body. The display 151 may be operable through an entire area or may be divided into a plurality of regions. In the latter case, a plurality of regions may be interoperable. For instance, an output window 151a and an input window 151b may be displayed on the display 151. A soft key 151c representing a digit for inputting a phone number or the like may be outputted to the input window 151b. If the soft key 151c is touched, a digit corresponding to the touched soft key 151c may be outputted to the output window 151a. If the first manipulating device 131 is manipulated, a call connection for the phone number displayed on the output window 151a is attempted.

In addition, the display 151 or the touchpad 135 may receive a touch input by scroll. A user may scroll the display 151 or the touchpad 135 to shift a cursor or pointer located at an entity (e.g., icon or the like) displayed on the display 151. Furthermore, in a case in which a finger is shifted on the display 151 or the touchpad 135, a path of the shifted finger may be visually displayed on the display 151. This may be useful in editing an image displayed on the display 151.

Consider a scenario in which both the display (touch screen) 151 and the touchpad 135 are touched together within a predetermined or threshold time range. This simultaneous touch example may correspond to a case in which the terminal body is held by a user using a thumb and a first finger (clamping). The above function may include activation or deactivation for the display 151 or the touchpad 135.

A mobile terminal as embodied and broadly described herein may include at least one of the aforementioned elements or modules described with reference to FIG. 1. The mobile terminal may include more elements or modules or less elements or modules than those shown in FIG. 1. For convenience, it is assumed that the display 151 of the mobile terminal 100 as broadly described herein is a touch screen.

The user interface of the mobile terminal as embodied and broadly described herein may conveniently manage a plurality of display objects, especially a widget. In more detail, the arrangement location of an icon for executing a widget and the widget corresponding to the icon may be freely changed, and the widget(s) may be grouped for management.

A widget may refer to an application program for single use, which may be arranged on a background image (home screen) or may be hosted on a web page. Unlike an icon, whose form is not changed, an appearance of a widget or information displayed through the widget may be changed. Generally, game, quiz, image correction tool, multimedia player, weather, and news short subtitle may be implemented through the widget. Widgets may be widely used to provide functions related to social networking. However, a widget as embodied and broadly described herein is not limited to the above examples, and may include an application having an execution zone, whose size may be changed, and an application that is not necessarily executed as an entire screen.

Figure 4A:
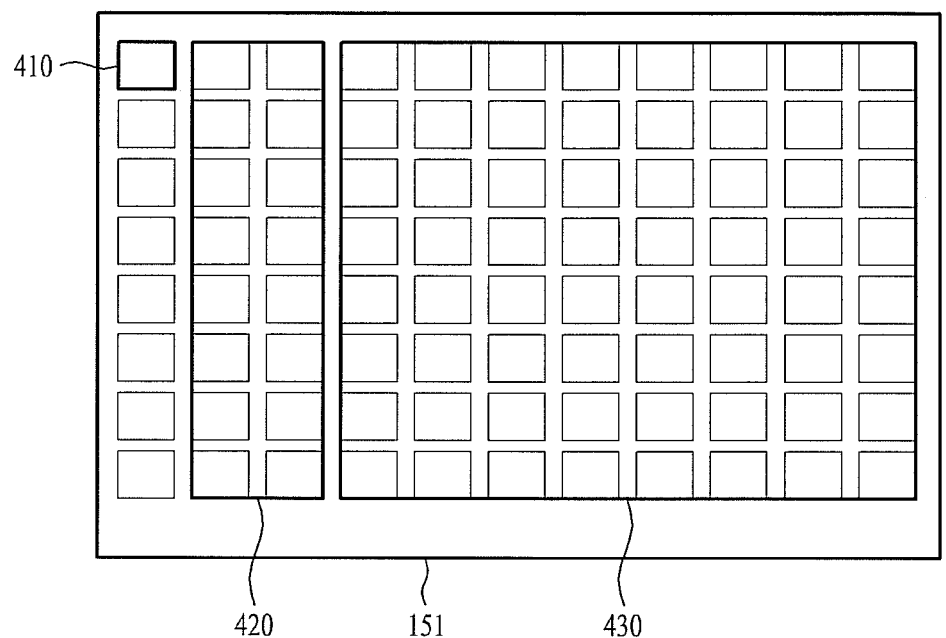
FIGS. 4A and 4B illustrate an exemplary basic unit of a user interface applied to embodiments as broadly described herein.

Hereinafter, a basic unit of a widget display of a user interface will be described with reference to FIG. 4. In FIG. 4A, it is assumed that the basic unit of the widget display has a size corresponding to the size of the display module.

Referring to FIG. 4A, the basic unit of widget display may have a grid form such that a plurality of blocks 410 are maintained at a predetermined interval. For example, left blocks 420 may be allocated for arrangement of the icon, and right blocks 430 may be allocated for display of the widget.

The icon displayed in the left blocks 420 may occupy one block (1×1), and the widget displayed in the right blocks 430 may occupy one block 1×1 to a block zone constituting the right blocks depending on its characteristics or size change of the user. The zone where widget is displayed in the right blocks 430 may correspond to an execution zone where an application is executed depending on the aforementioned definition of the widget. The icon arranged in the left blocks 420 may perform a shortcut function on the widget, which may be executed in the right blocks 430.

Hereinafter, the aforementioned basic unit of widget display will be referred to as a "lens" in this specification. In such a lens, the block where the icon is displayed will be referred to as "icon zone", and the block where the widget is displayed will be referred to as "widget zone".

Although the lens is displayed on the display module as essentially the entire screen in FIG. 4A, this is exemplary and the lens may have various sizes. In other words, one lens may have a size corresponding to one display module, or may be set at a size greater or smaller than that of the display module. Also, various modifications may be made in the form/number of grids and size/form of the icon zone and the widget zone if necessary.

A more detailed form of the lens described with reference to FIG. 4A will be described with reference to FIG. 4B. In the following drawings, including FIG. 4B, to provide for concise understanding, the detailed form of the icon or the widget or display information may be partially omitted.

Figure 4B:
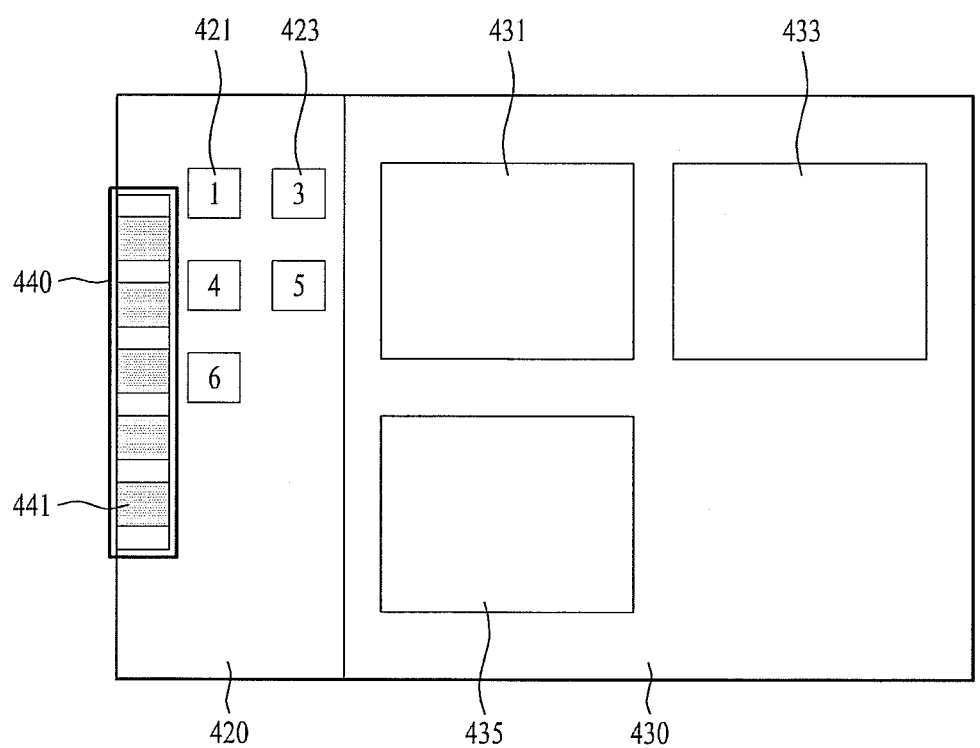

Referring to FIG. 4B, a plurality of icons, including a first icon 421 and a third icon 423, may be arranged in the icon zone 420. Also, three widgets 431, 433 and 435 may be arranged in the widget zone 430.

A global menu zone 440 may be arranged in the lens. At least one icon 441 corresponding to one of a plurality of menus (for example, main menu, file menu, clip board menu, search menu, etc.), which may be generally applied regardless of the type of widget, may be arranged in the global menu zone 440.

Figure 5:
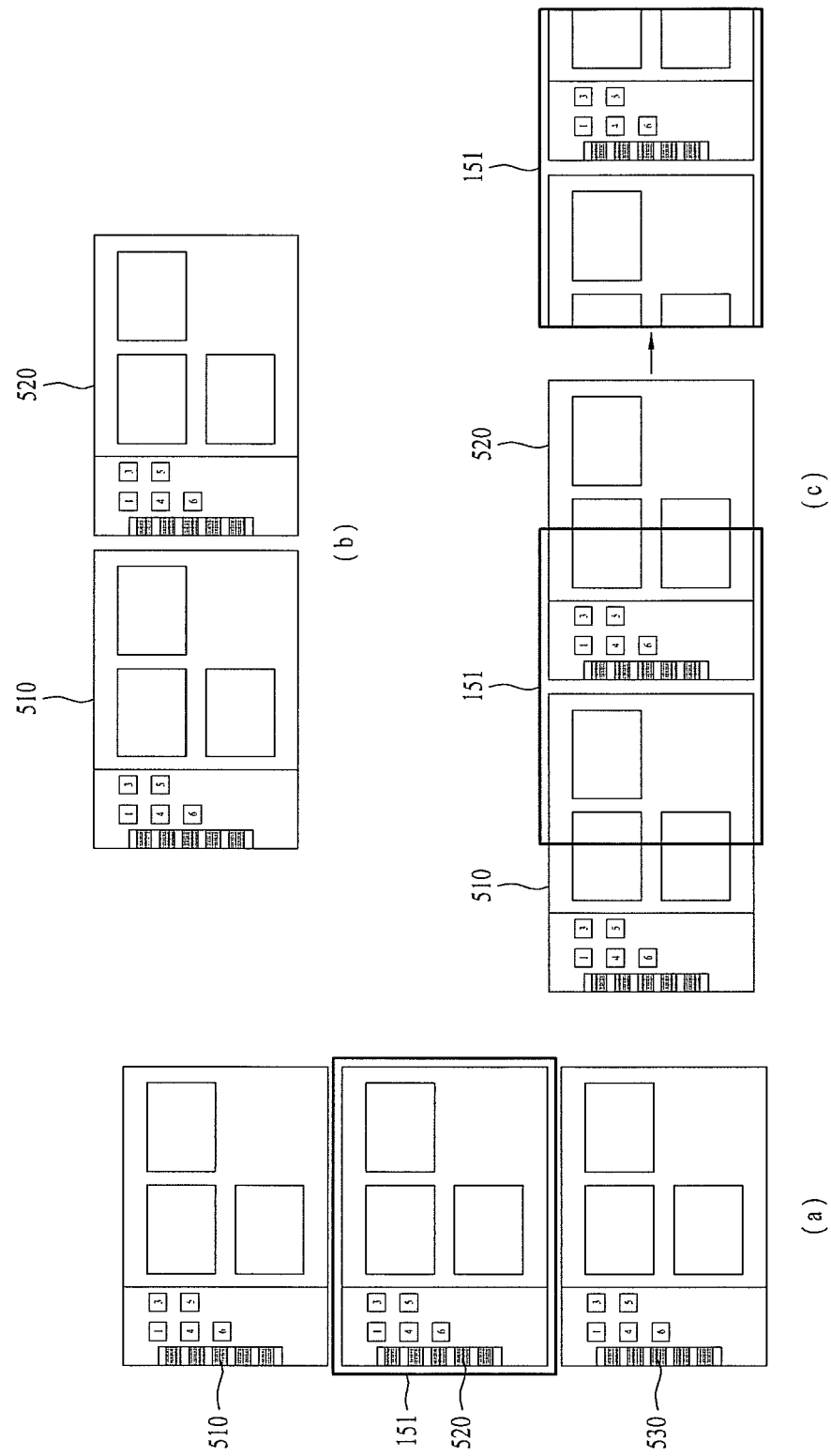
FIG. 5 illustrates an exemplary arrangement of a plurality of lenses.

FIG. 5 illustrates an exemplary arrangement of a plurality of lenses, in which it is assumed that one lens has a size corresponding to the entire screen of the display module.

Referring to (a) of FIG. 5, three lenses 510, 520 and 530 may be arranged and connected with one another in a vertical direction. If the center lens 520 is displayed on the display module 151, and the lens 520 is scrolled in a downward direction, the upper lens 510 may be displayed on the display module 151. When the upper lens 510 is displayed, if a command for scrolling the lens in a downward direction is input once again, the lens may not be scrolled any further in the directions, and the lower lens 530 may be displayed in a circulating form. In other words, if the command for scrolling in a downward direction continues to be input, the lenses may be displayed in the order of 520->510->scroll not available or 520->510->530->520->510->....

Alternatively, the two lenses 510 and 520 may be arranged in a horizontal direction as illustrated in (b) of FIG. 5.

When the left lens 510 is displayed and a scroll command is input in a left direction, as illustrated in (c) of FIG. 5, the left lens 510 gradually disappears from the display 151 and at the same time the right lens 520 may gradually be displayed.

The aforementioned lens arrangements are exemplary, and lens arrangements as embodied and broadly described herein are not limited to the above examples. For example, the lenses may be arranged in combination of horizontal and vertical arrangements.

A lens management menu for managing a plurality of lenses will be described with reference to FIG. 6.

A lens management menu may refer to a menu that displays and manages a plurality of lenses at one time in a single lens. The lens management menu may be a basic screen initially displayed after booting is performed, or may be displayed as a default if the display module is turned on again after it is turned off, such as release of a lock screen. A lens management menu may also be displayed during manipulation of a predetermined menu or a specific hardware key button.

Figure 6A:
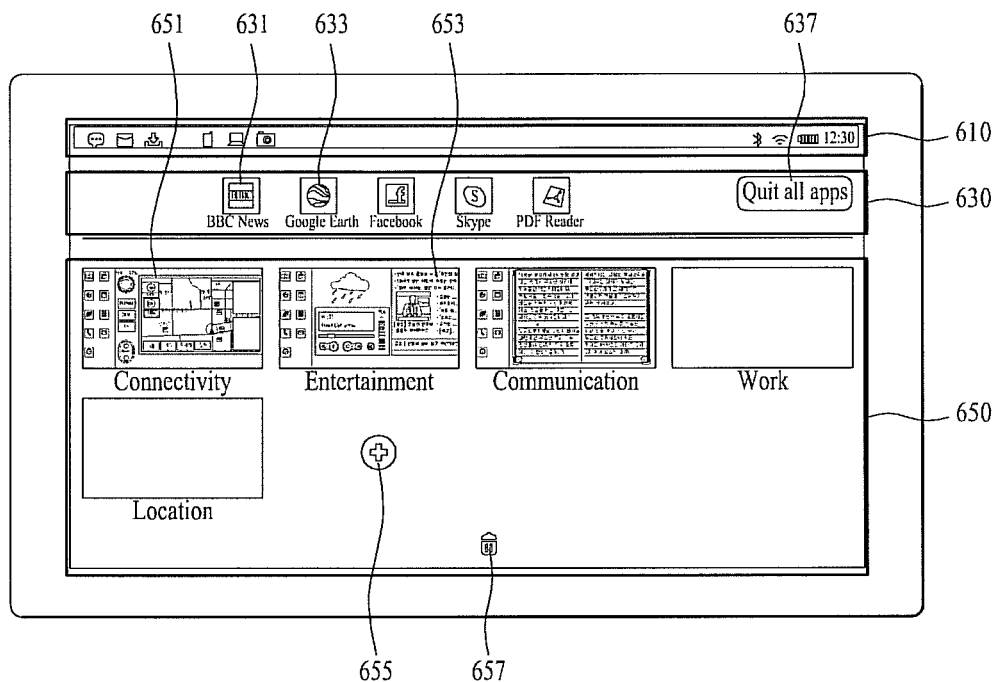
FIGS. 6A to 6D illustrate an exemplary lens management menu.

Referring to FIG. 6A, an indicator zone 610 may be arranged along the top of the display to briefly indicate an operation state (for example, message/mail reception or not, battery state, receiving sensitivity, etc.) of the mobile terminal.

An icon display zone 630 where icons 631 and 633 corresponding recently executed widgets are displayed may be arranged at a center of the display. In certain embodiments, the left icon 631 may indicate the most recently executed widget. The icons displayed in the zone 630 may indicate the order of widgets executed within one lens, or may indicate the order of widgets executed in all the lenses. A process end button 637 may be arranged in the zone 630 to quit the widgets corresponding to the icons displayed in the zone 630.

Thumbnails 651 and 653 of the respective lenses may be arranged in a lower zone 650 of the display, and if the user drags and drops an icon 655 for adding a new lens and a random lens, a recycle bin icon 657 for deleting the corresponding lens may be displayed in the lower zone 650 of the display. In this case, if any one of the thumbnails is selected by touch, the lens corresponding to the corresponding thumbnail may be displayed as the entire screen.

Figure 6B:
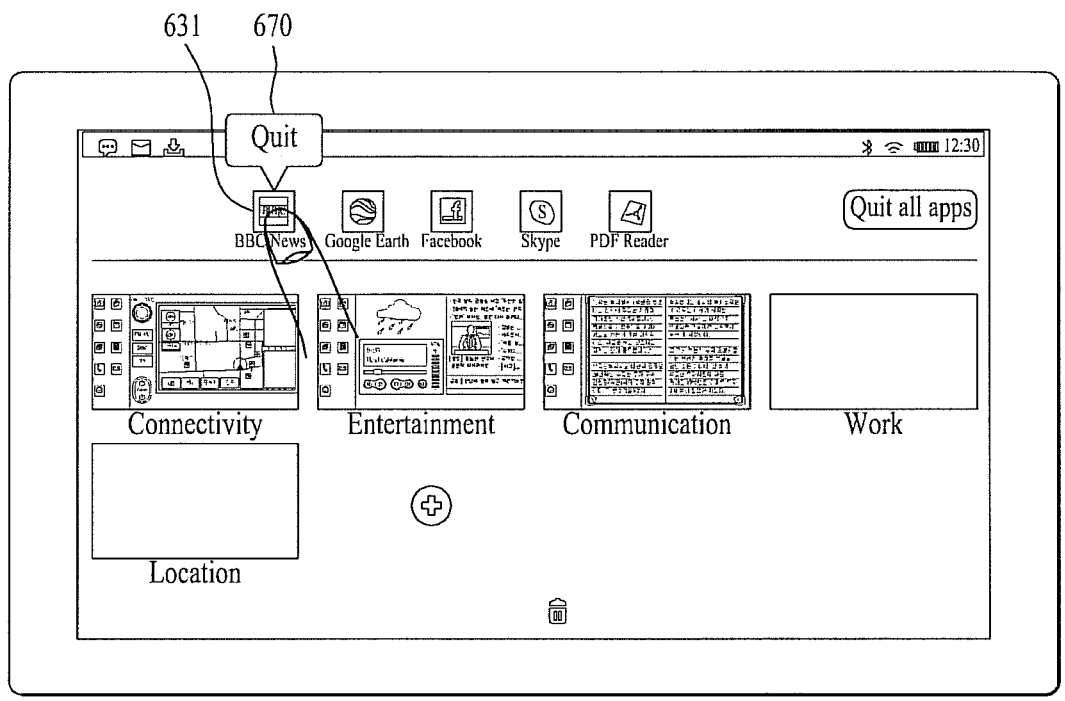
Figure 6C:
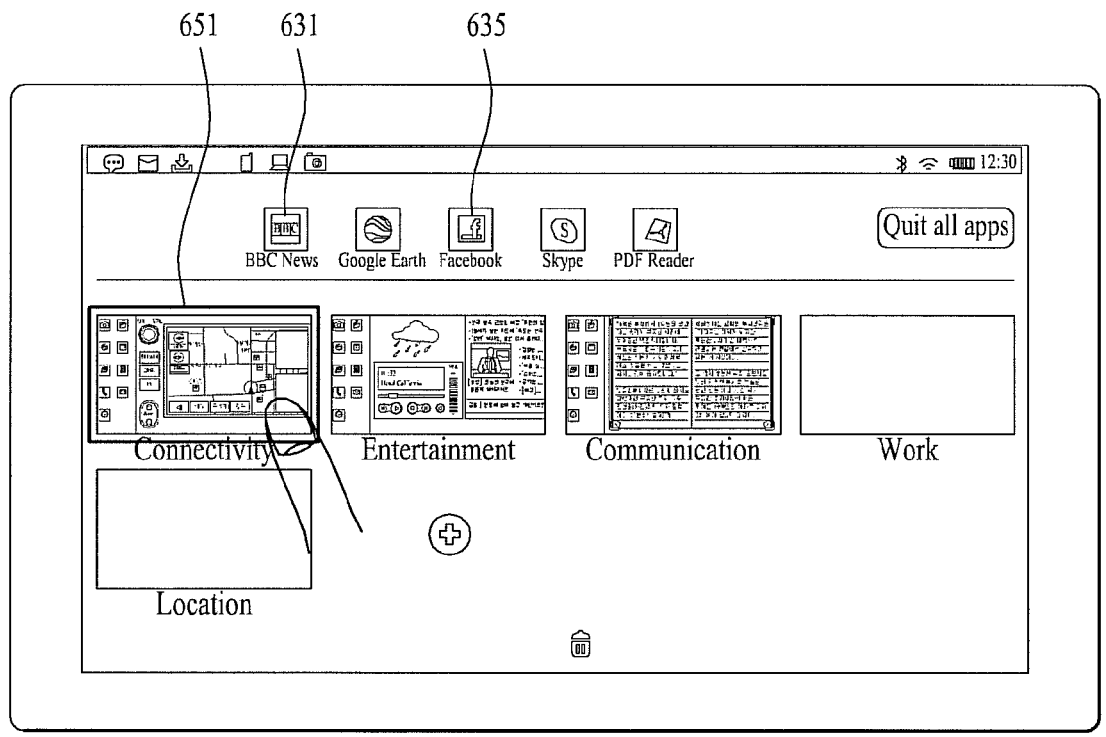

If the user desires to quit any one of the widgets corresponding to the icon located in the icon display zone 630, a method of selecting a quit menu 670 may be used, wherein the quit menu 670 is displayed when the user touches or long-touches an icon 631 corresponding to a widget to be quit as illustrated in FIG. 6B.

Also, if the icons displayed in the center zone 630 are indicative of the order of the widgets executed in all the lenses, and one lens 651 is selected by input, such as a long touch, as illustrated in 6C, a predetermined visual effect may be applied to the icons 631 and 635 corresponding to the widget executed in the selected lens.

Figure 6D:
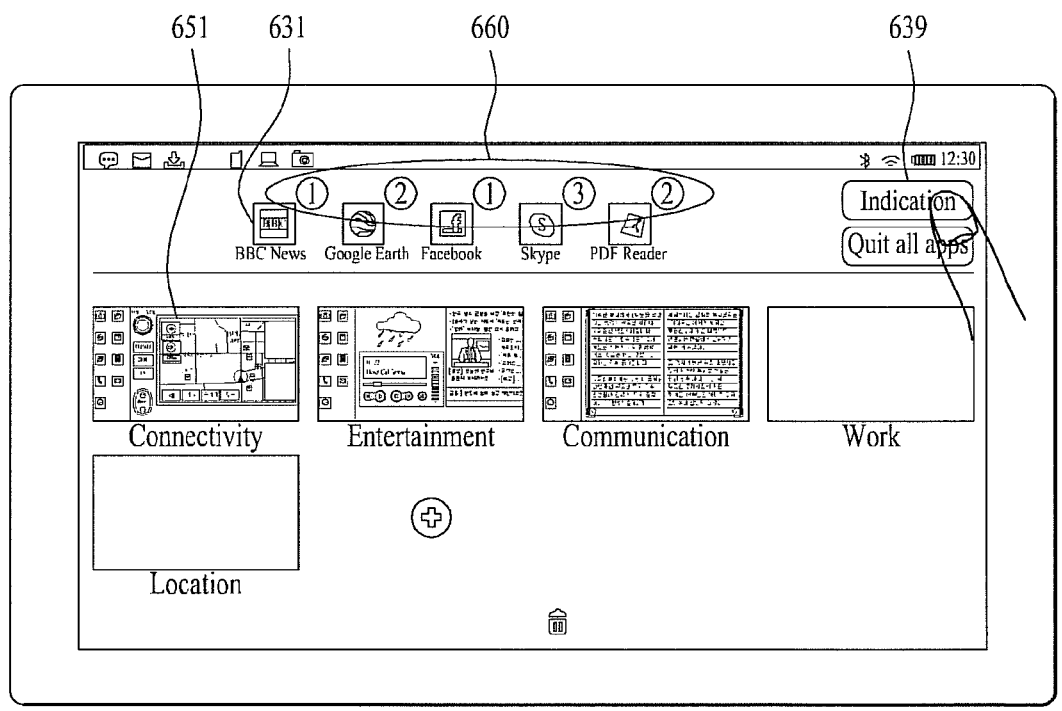

Alternatively, a menu icon 639 for displaying an execution location may be arranged in the center zone 630 as illustrated in FIG. 6D, and if the corresponding menu icon 639 is selected, the lens where the widget corresponding to the corresponding icon 639 is executed may be displayed by a number in the area 660. Instead of the number, a color change, or an arrow for directly joining the icon with the lens, or other indicator may be used.

Figure 7A:
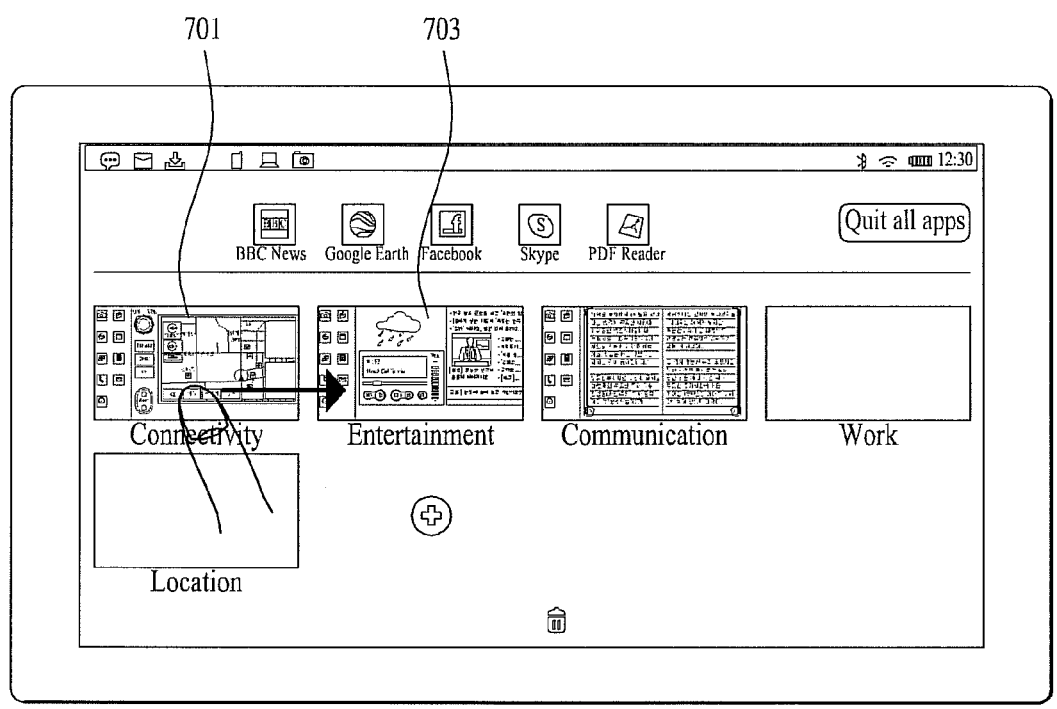
FIGS. 7a to 7c illustrate an exemplary a method of changing arrangement of a lens thumbnail in a lens management menu.
Figure 7B:
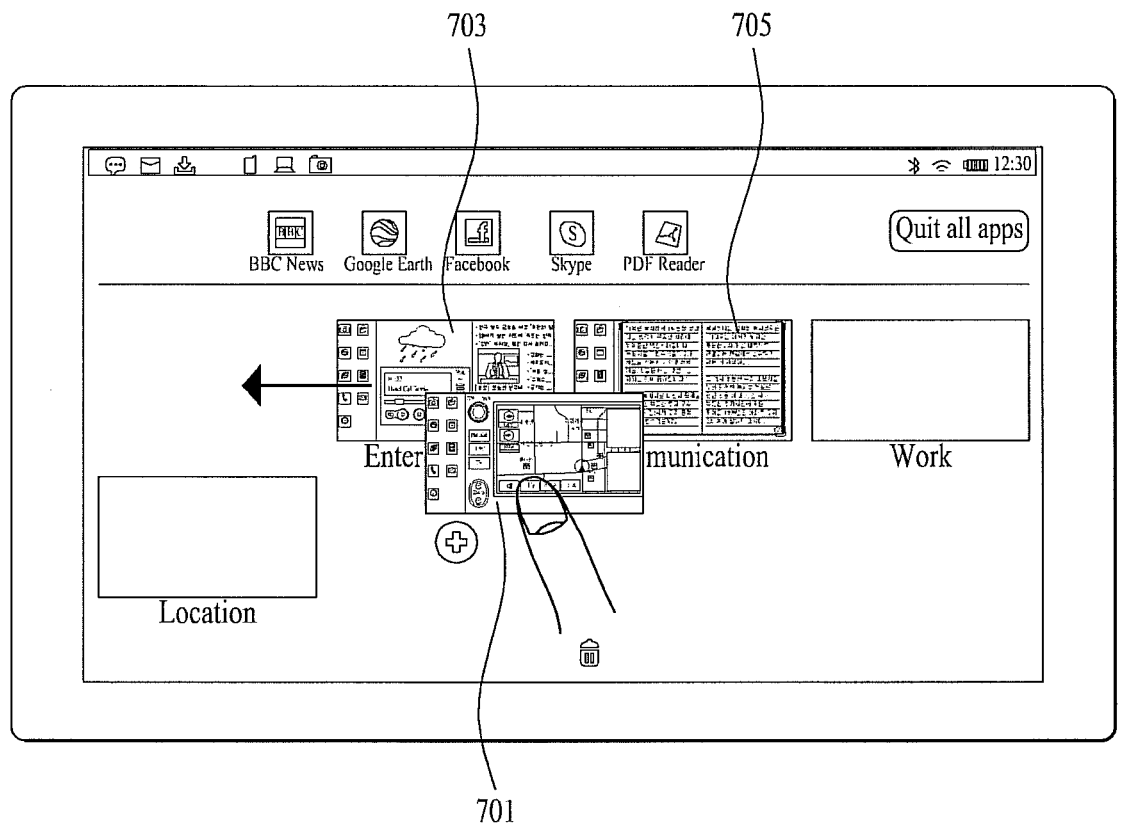
Figure 7C:
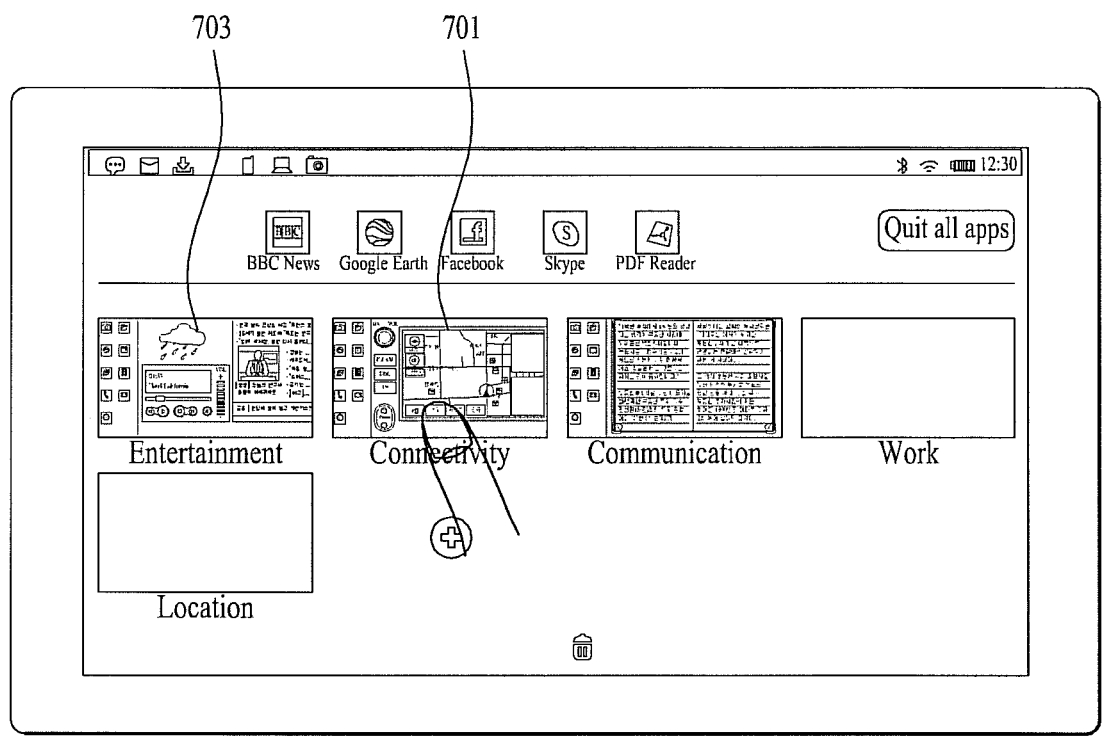

FIGS. 7A to 7C illustrate an exemplary method of changing an arrangement of a lens thumbnail in a lens management menu. For example, as shown in FIG. 7A, the user may exchange an upper thumbnail 701 at the left with another thumbnail 703 located next to the upper thumbnail 701. First, the user may drag (i.e., long touch, hold & drag) a desired thumbnail 701 for location change to the right side by making the thumbnail 701 movable through a touch input such as a long touch. Once the dragged thumbnail 701 is located at, for example, a middle location between a left center thumbnail 703 and a right center thumbnail 705 for a certain time, as illustrated in FIG. 7B, the left center thumbnail 703 is moved to the left side and the dragged thumbnail 701 is arranged at the desired location, as illustrated in FIG. 7C, an the user may terminate location change of the thumbnail by releasing the touch input.

Next, a method of incorporating two lenses into one will be described with reference to FIG. 8.

Figure 8A:
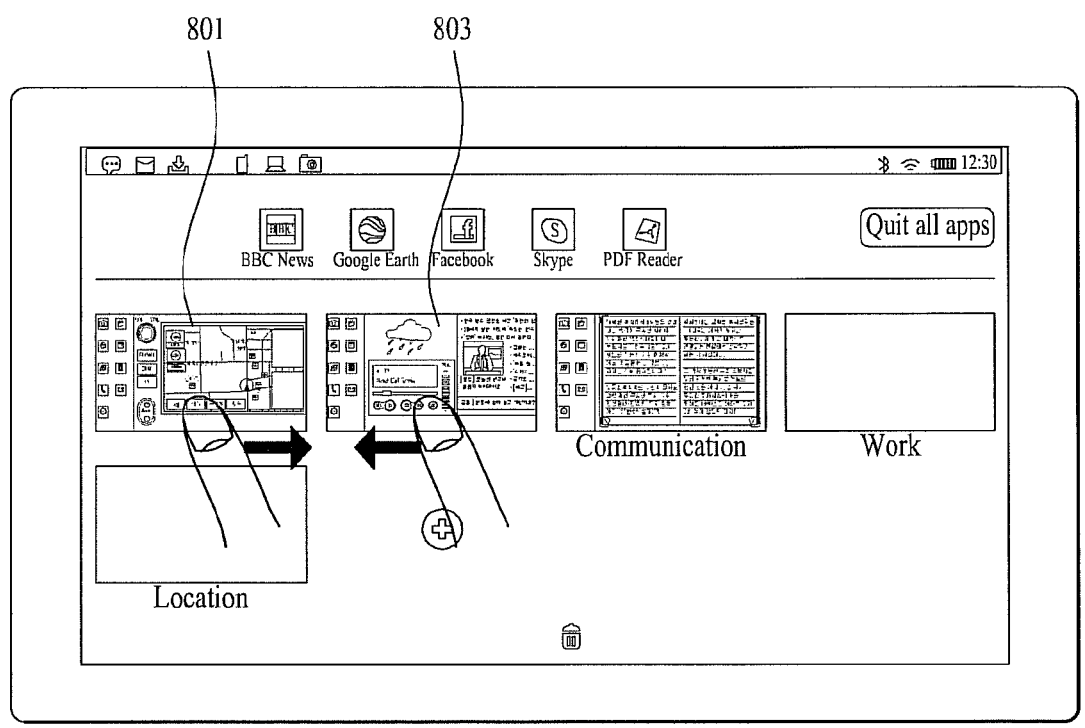
FIGS. 8a to 8c illustrate an exemplary method of incorporating two lenses in a lens management menu.
Figure 8B:
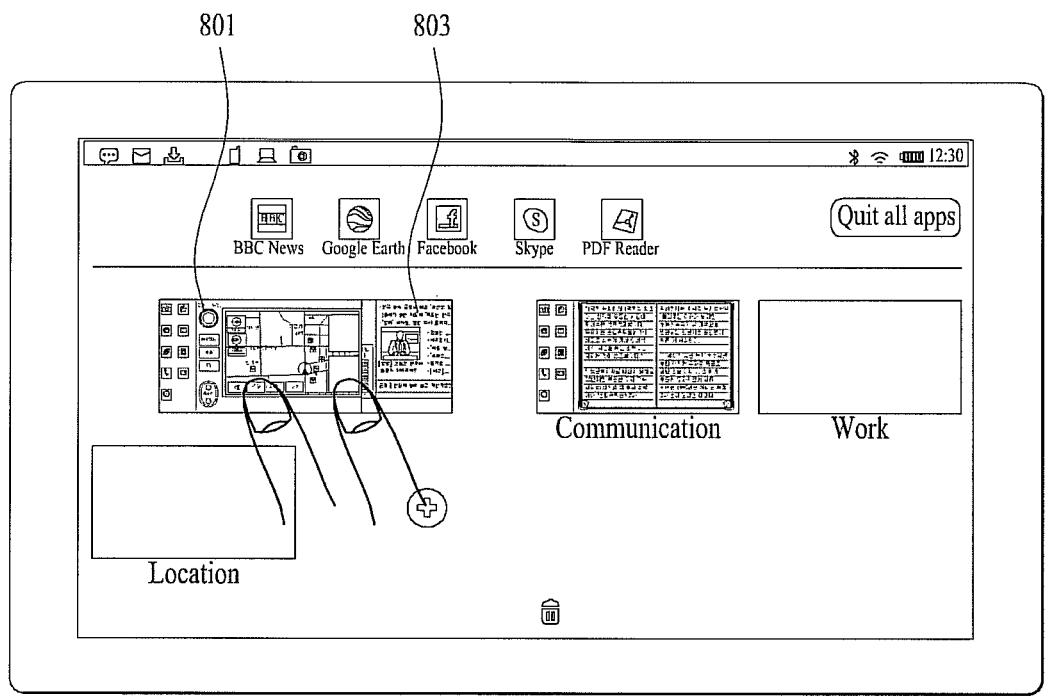
Figure 8C:
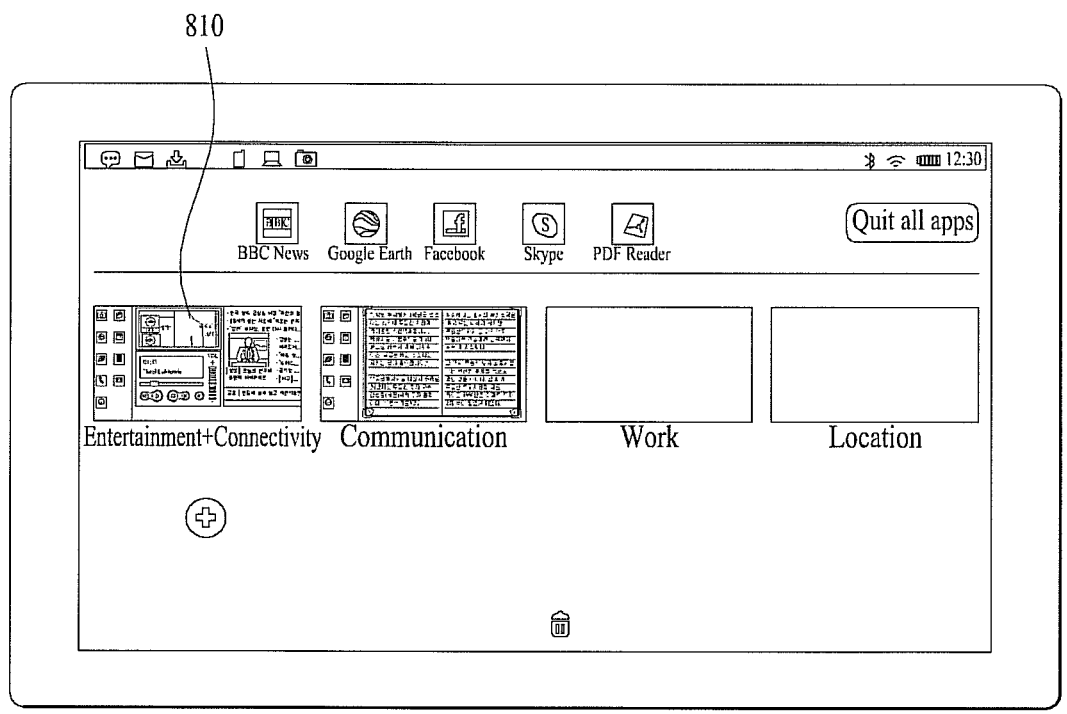

FIGS. 8A to 8C illustrate an exemplary a method of incorporating two lenses in a lens management menu.

First, as illustrated in FIG. 8A, the user touches (i.e., multi-touches) two desired thumbnails 801 and 803 with different fingers. If the distance between the touch points by the respective fingers becomes narrow as illustrated in FIG. 8B while the user touches the two thumbnails 801 and 803, the two thumbnails 801 and 803 are combined and a new thumbnail 810 is generated as illustrated in FIG. 8C. The lens generated by incorporation of the two thumbnails may include icons and widgets provided in the two lenses before incorporation.

A method of adding a widget to a widget zone in a lens will be described with reference to FIG. 9, which illustrates an exemplary method of a method of adding a widget in a lens.

Referring to (a) of FIG. 9, the user selects an icon 915 from an icon zone 910 and drags the selected icon 915 in to a widget zone 920 to execute a widget corresponding to the second icon 915 in the widget zone 920. As a result, if the corresponding icon 915 is dragged to an empty space of the widget zone 920, as illustrated in (b) of FIG. 9, a zone that may accommodate a widget corresponding to the icon 915 may be displayed in the form of a frame 930. When the touch of the corresponding icon 915 is released, the icon 915 disappears as illustrated in (c) of FIG. 9, and a widget 940 corresponding to the dragged icon 915 is displayed in the frame 930.

Figure 10:
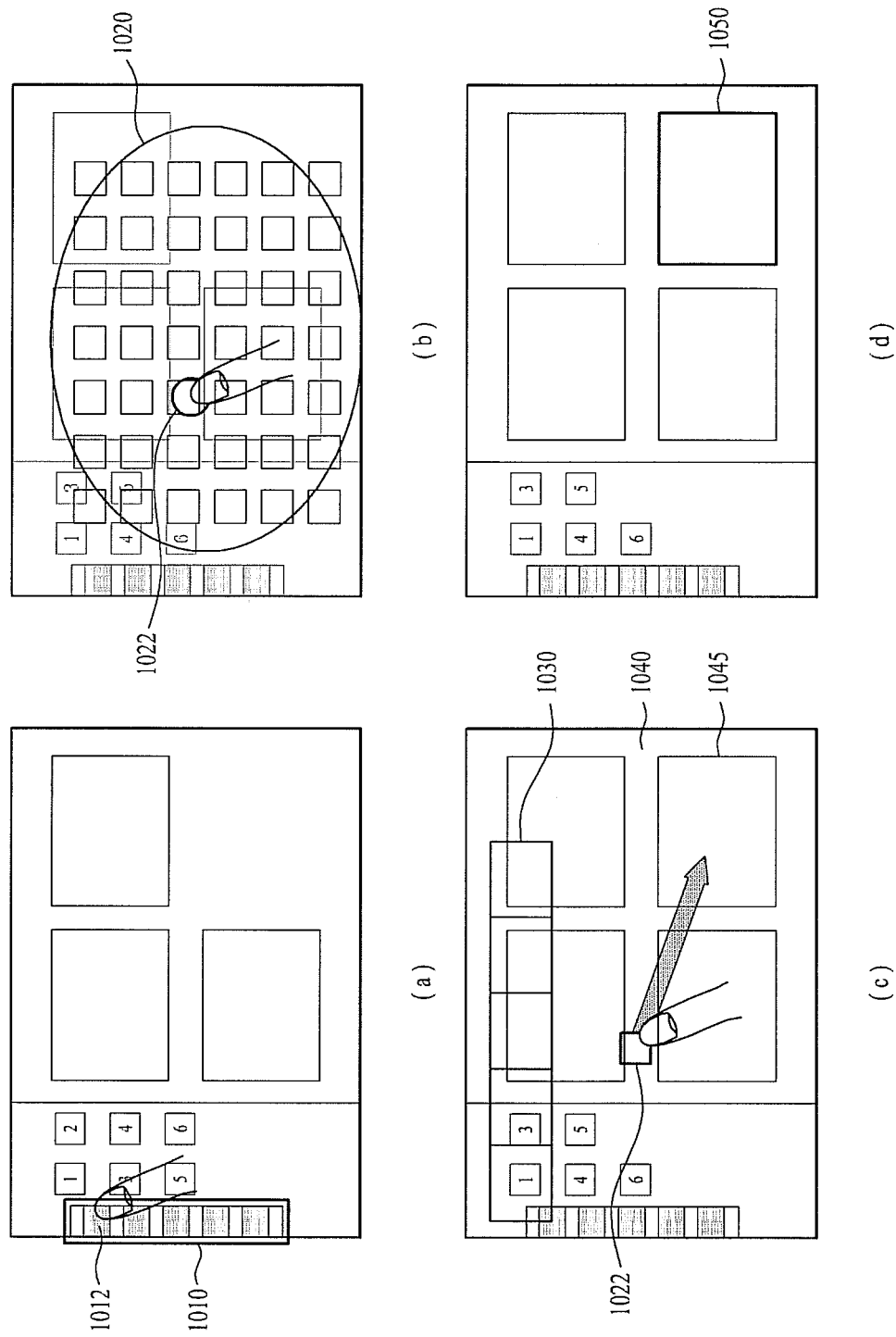
FIG. 10 illustrates another exemplary method of adding a widget in a lens according to an embodiment as broadly described herein.

FIG. 10 illustrates another exemplary method of adding a widget in a lens.

Referring to (a) of FIG. 10, the user can select an entire icon display menu 1012 from a global menu zone 1010 to add a widget corresponding to an icon which does not exist in the icon zone. As a result, an icon list 1020, which does not exist in the icon zone and corresponds to a widget that can be displayed in the widget zone 1040, is displayed as illustrated in (b) of FIG. 10, and the user can select one icon 1022 from the icon list. In certain embodiments, a predetermined visual effect may be given to the entire lens except for the icon list 1020 to allow the user to more easily identify the icon list 1020.

If the icon 1022 is selected, the visual effect disappears as illustrated in (c) of FIG. 10, and if a plurality of lenses exist, a thumbnail 1030 of the plurality of lenses may be displayed. If the user drags the selected icon 1022 to an empty space of the widget zone 1040, a zone where a widget corresponding to the icon 1022 may be displayed in the form of a frame 1045. Afterwards, if the touch of the corresponding icon 1022 is released, the icon 1022 disappears as illustrated in (c) of FIG. 9, and a widget 1050 corresponding to the dragged icon is displayed in the frame 1045.

Figure 11:
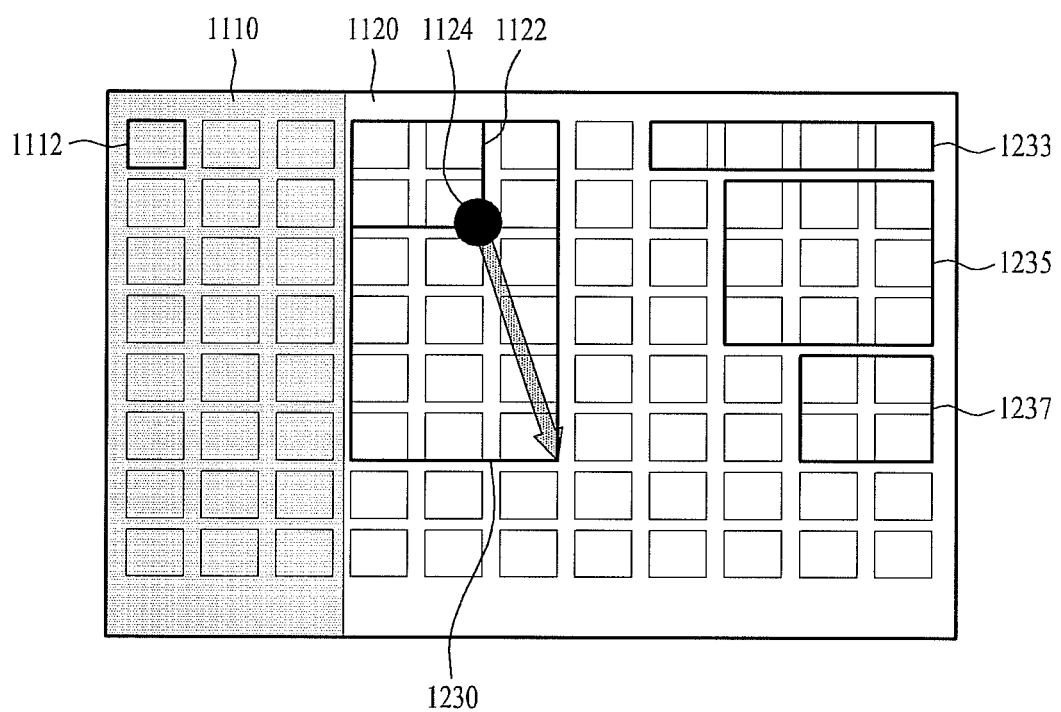
FIG. 11 conceptionally illustrates a change of location and form of a widget in a lens according to an embodiment as broadly described herein.

FIG. 11 conceptionally illustrates a change of location and form of a widget in a lens as embodied and broadly described herein.

Referring to FIG. 11, an icon 1112 located in an icon zone 1110 may be moved to a grid block within the corresponding zone through touch-hold & drag. Also, a size of a widget 1122, for example of 2×2 size, located in a widget zone 1120 may be changed to occupy another (for example, larger or smaller) zone 1230 by dragging a lower right corner portion 1124. If the widget zone 1120 except for the corner portion is dragged, the location of the corresponding widget 1122 may be changed. Accordingly, the widget 1122 may be arranged in the widget zone 1120 in various sizes, forms and locations 1233, 1235, and 1237 through the aforementioned method of changing a size and the aforementioned method of changing a location. If the size or form of the widget is changed, a form of information displayed on the changed widget may also be changed. For example, if text information is displayed in two columns on the widget 1122 of 2×2 size and the form of the corresponding widget 1122 is changed to a widget 1233 of 4×1 size, the corresponding text information may be displayed in a long row.

Figure 12:
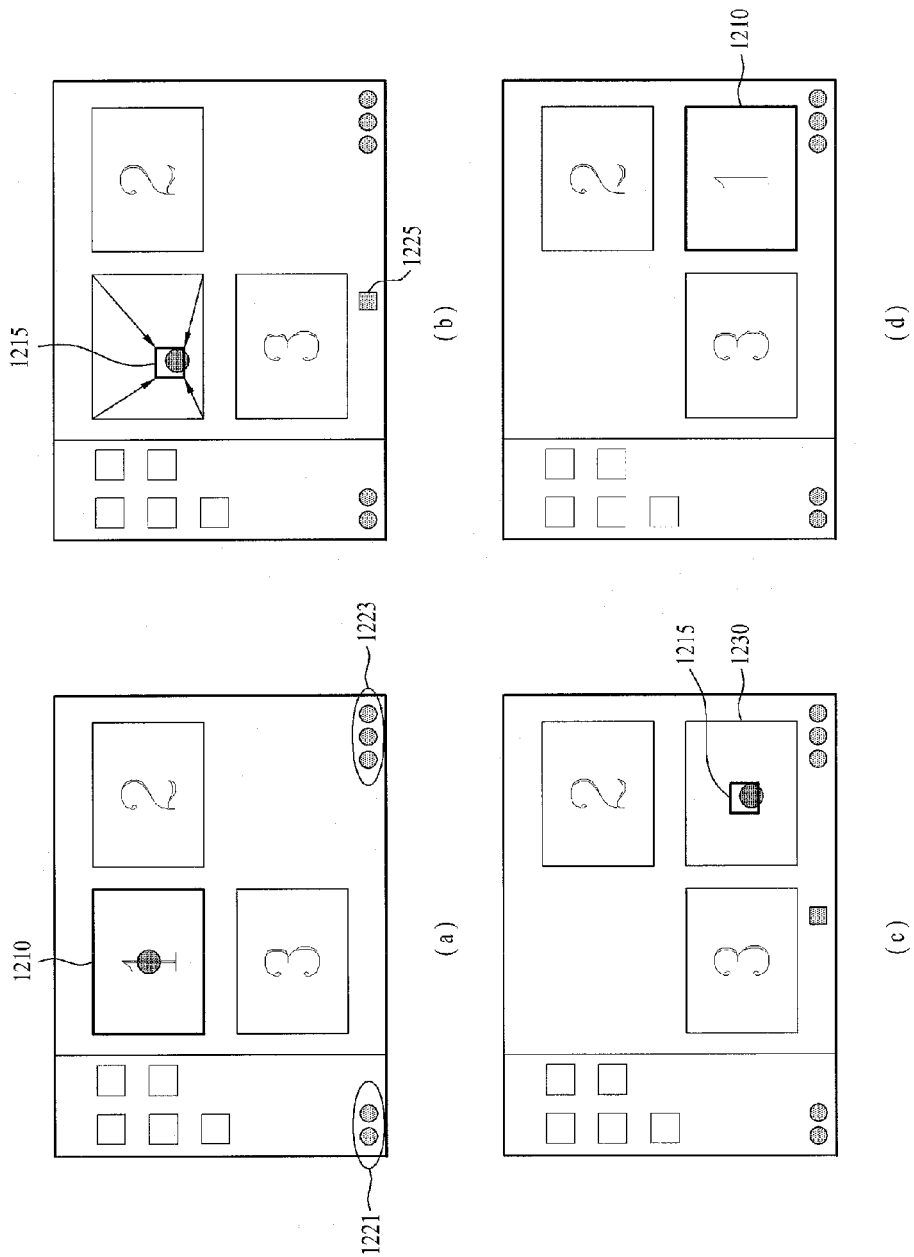
FIG. 12 illustrates an exemplary method of changing a location of a widget in a lens according to an embodiment as broadly described herein.

FIG. 12 illustrates an exemplary method of changing a location of a widget in a lens as embodied and broadly described herein.

Referring to (a) of FIG. 12, three widgets are displayed on the widget zone. If a plurality of lenses are used, indicators 1221 and 1223 may represent a relative position between the lens currently displayed and the other lenses and may be displayed at the bottom of the icon zone or other location as appropriate. In more detail, the left indicator 1221 indicates that two additional lenses exist at the left side of the lens currently displayed, and the right indicator 1223 indicates that three additional lenses exist at the right side of the lens currently displayed. In other words, when six lenses are arranged in a horizontal direction, these indicators 1221 and 1223 indicate that the lens currently displayed is the third one of the six lenses from the left side.

If the user selects a widget 1210 located at the left upper end of the widget zone through a predetermined touch input (for example, long touch & hold) to change the location of the widget 1210 to an empty space, the selected widget 1210 may be changed to an icon 1215 as illustrated in (b) of FIG. 12. In certain embodiments, as the widget 1210 is changed to a movable form, a recycle bin 1225 may be displayed at the center of the lower end of the lens or other location as appropriate. If the touch of the widget 1210 changed into the icon 1215 is released by drag through the recycle bin 1225, the corresponding widget disappears from the widget zone.

If the widget changed to the icon 1215 is moved to an empty zone at the right lower end of the widget zone by drag, a zone where the widget will be displayed can be displayed in the form of a frame 1230. If the touch of the icon 1215 is then released, the icon 1215 is changed back to the widget 1210, which occupies the frame 1230, as illustrated in (d) of FIG. 12.

Figure 13:
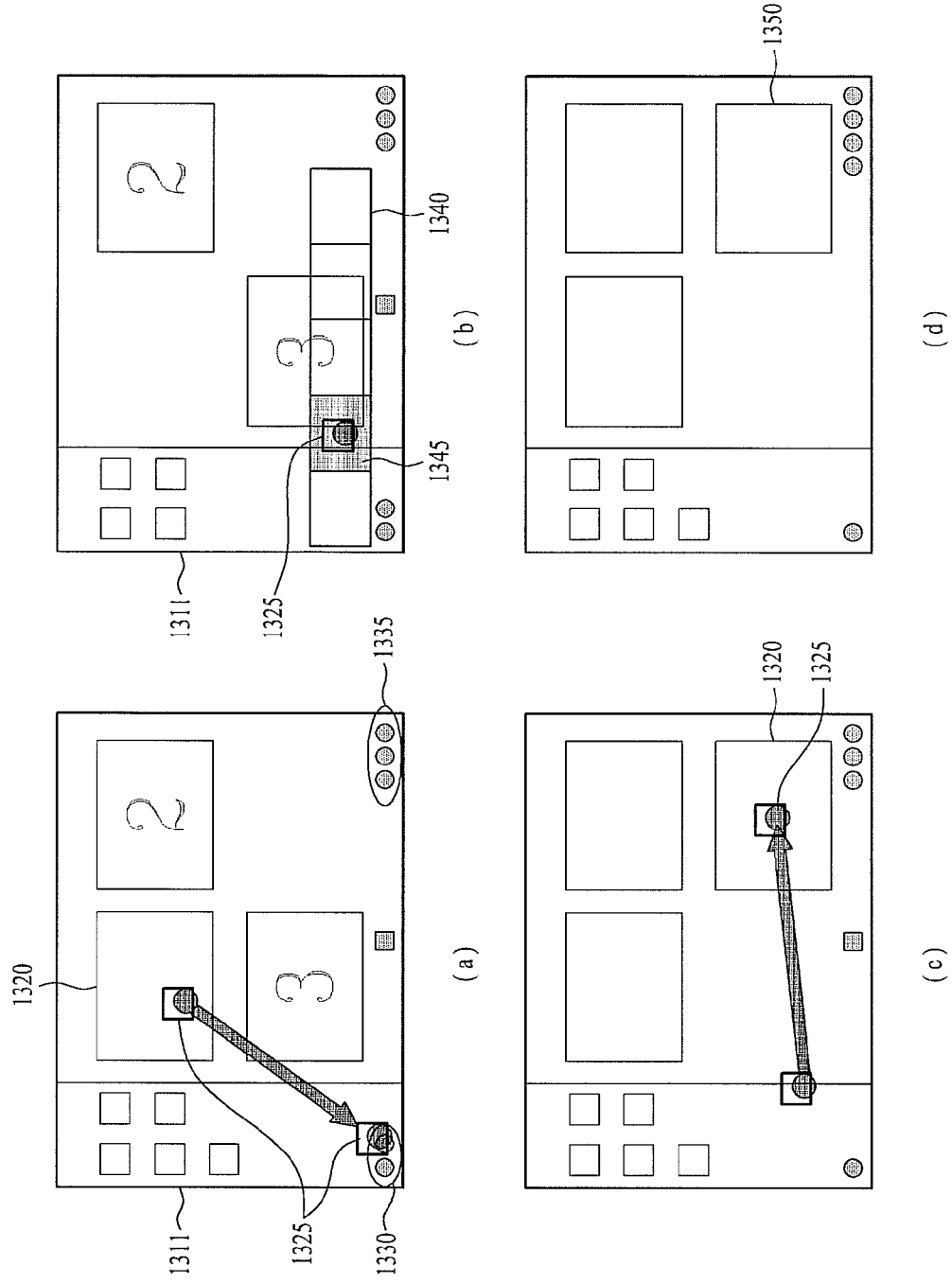
FIG. 13 illustrates another exemplary method of changing a location of a widget in a lens according to an embodiment as broadly described herein.

FIG. 13 illustrates another exemplary a method of changing location of a widget in a lens as embodied and broadly described herein.

Referring to (a) of FIG. 13, the user selects a widget 1320 located at the left upper end to form an icon 1325 and then drags the icon 1325 to an indicator 1330 located at the lower end of the icon zone. If a plurality of icons/lenses exist as illustrated in (a) of FIG. 12, the indicator 1330 may represent a relative position between the lens currently displayed and the other lenses. The icon 1325 may instead be dragged to an indicator 1335 located at the right lower end of the lens, instead of the indicator 1330 located at the left lower end of the lens, or at other location(s) as appropriate.

Thumbnails 1340 of the lenses may be displayed as illustrated in (b) of FIG. 13. As the user moves the icon 1325 to the thumbnail 1345 of the second lens, the second lens is displayed as illustrated in (c) of FIG. 13. In this case, if the user drags and moves the icon 1325 to an empty zone of the right lower end of the widget zone, a zone where the corresponding widget will be displayed can be displayed in the form of a frame 1320. If the touch of the icon 1325 is then released, the icon is changed to the widget 1350, which occupies the frame 1320, as illustrated in (d) of FIG. 13. As a result, the widget located at the left upper end of the third lens is changed to the right lower end of the second lens.

In addition to the method of moving a widget between the aforementioned lenses, after the widget is selected and changed to a movable state (for example, icon form), in certain embodiments, if it is dragged to the left corner of the lens and stays therein for a certain time, the lens located at the left side of the current lens may be scrolled and then displayed. Widget movement between the lenses may also be performed by dragging the widget from the widget zone of the lens displayed as a result of scroll and releasing the touch of the widget. Widget movement to the lens located at the right side or in up/down direction in addition to the lens located at the left side may be performed similarly.

Figure 14:
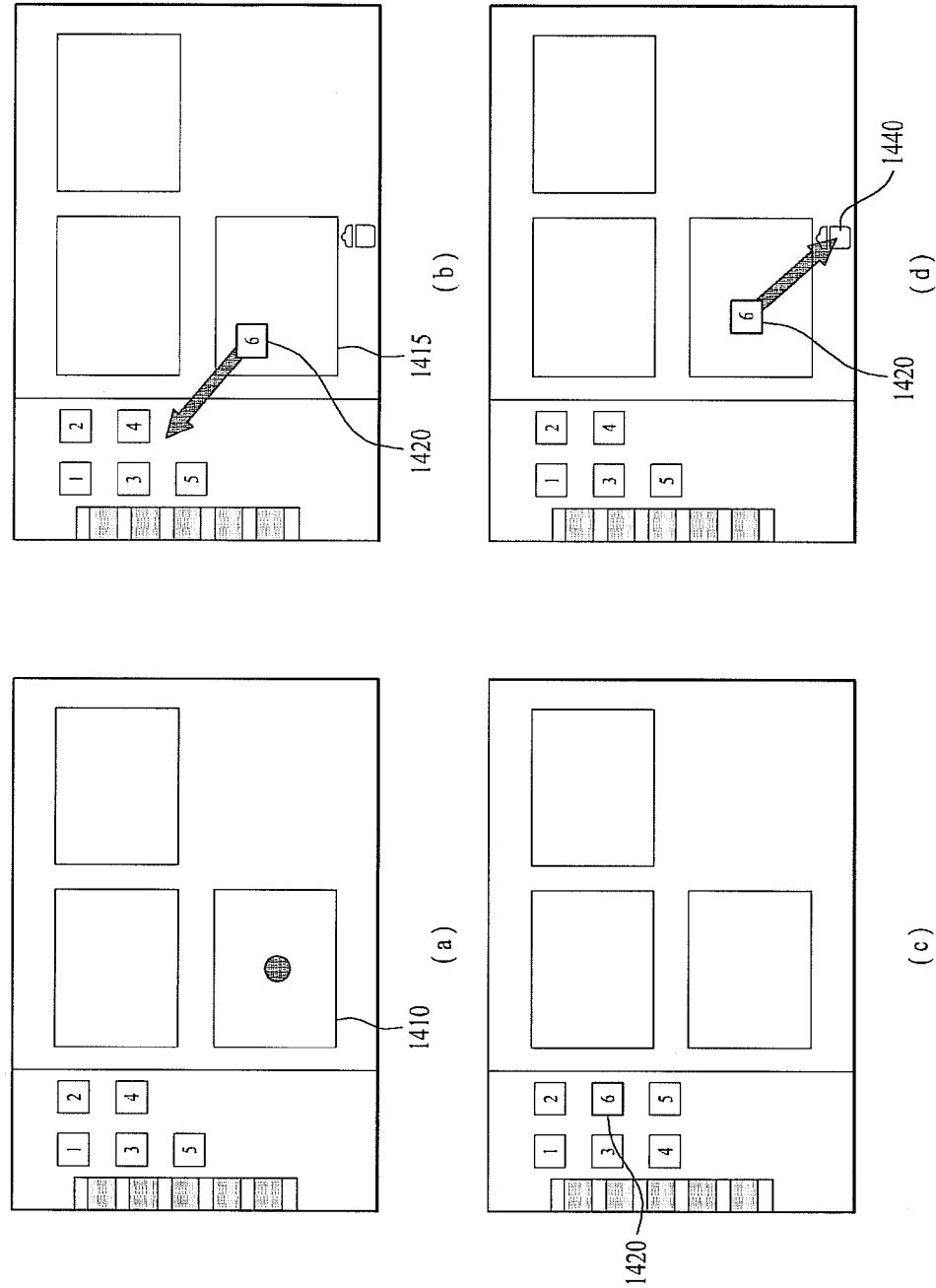
FIG. 14 illustrates an exemplary method of moving a widget to an icon zone on a lens according to an embodiment as broadly described herein.

FIG. 14 illustrates an exemplary method of moving a widget to an icon zone on a lens as embodied and broadly described herein.

Referring to (a) of FIG. 14, the user selects a widget 1410 located at the left lower end from a widget zone, and then forms an icon 1420 as illustrated in (b) of FIG. 14. The user then drags the icon 1420 between the third icon and the fourth icon within an icon zone. As a result, the icon 1420 is arranged next to the third icon of the icon zone as illustrated in (c) of FIG. 14.

Instead of dragging the icon 1420 (changed from the widget 1440), to the icon zone as illustrated in (d) of FIG. 14, the icon 1425 may be dragged to a recycle bin 1440. In this case, the icon 1425 dragged to the recycle bin 1440 may be moved to a predetermined location of the icon zone, or may be included in the icon list 1020 as illustrated in (b) of FIG. 10.

Figure 15:
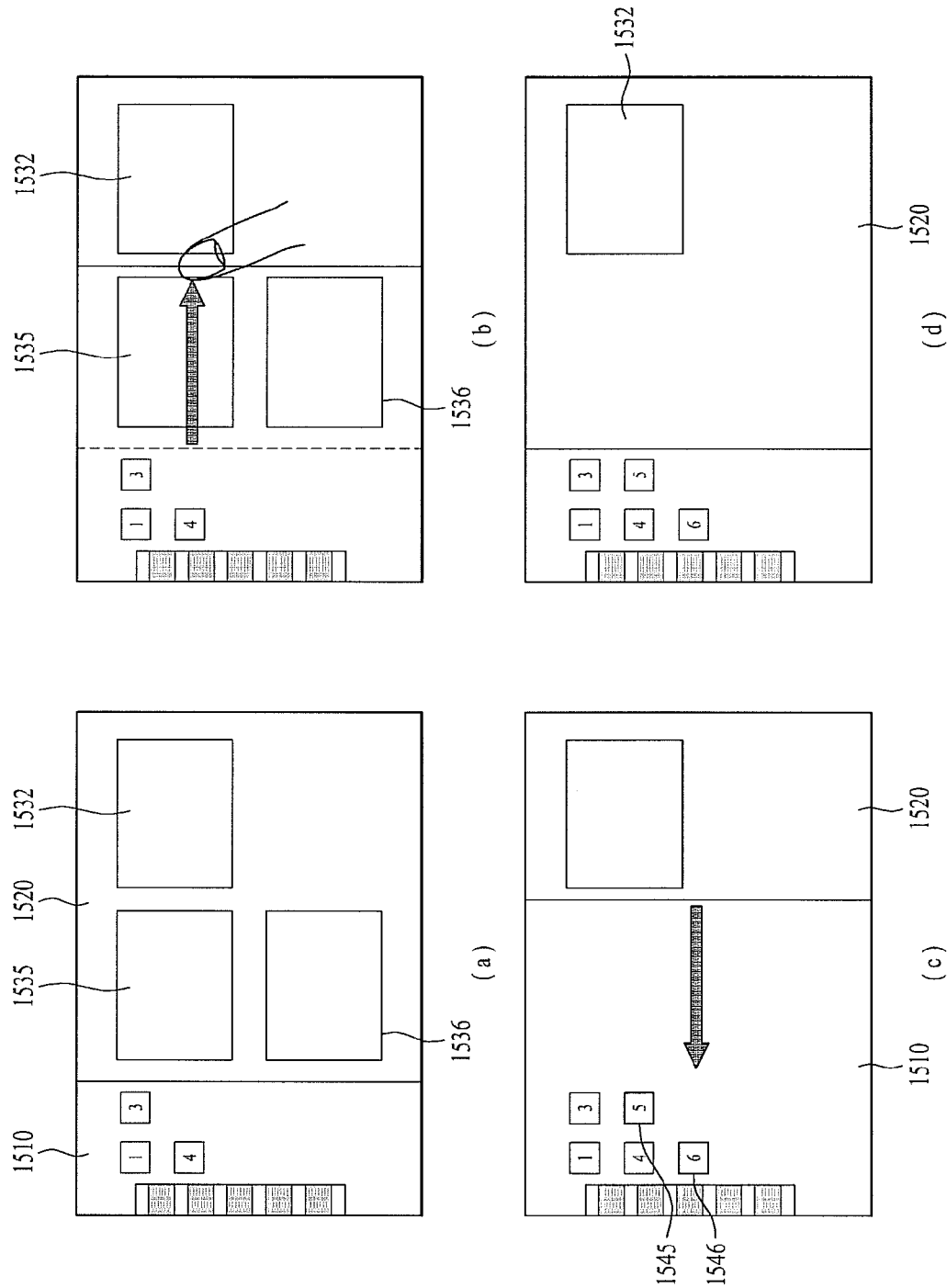
FIG. 15 illustrates another exemplary method of moving a widget to an icon zone on a lens according to an embodiment as broadly described herein.

FIG. 15 illustrates another exemplary a method of moving a widget to an icon zone on a lens as embodied and broadly described herein.

Referring to (a) of FIG. 15, first, third and fourth icons are arranged in an icon zone 1510 of the lens, and a widget 1532 corresponding to a second icon, a widget 1535 corresponding to a fifth icon and a widget 1536 corresponding to a sixth icon are arranged in a widget zone 1520.

As illustrated in (b) of FIG. 15, the icon zone 1510 may be extended to the right side to include the widget 1535 corresponding to the fifth icon and the widget 1536 corresponding to the sixth icon. In order to extend the icon zone 1510, the right end of the icon zone 1510 may be dragged to a desired location.

As a result, the widgets included in the extended icon zone 1510 are changed to the icons 1545 and 1546 and then arranged in appropriate order in the icons arranged in the icon zone as illustrated in (c) of FIG. 15. Afterwards, if the size of the icon zone 1510 returns to the original size, the widget 1532 corresponding to the second icon only remains in the widget zone 1520 as illustrated in (d) of FIG. 15. In other words, if the icon zone 1510 is extended to include some of the widgets arranged in the widget zone, the widgets included in the extended icon zone 1510 may be changed to the corresponding icon and then arranged in the icon zone 1510.

In certain embodiments, as the icon zone 1510 is extended to the widget zone, if the widget zone is reduced, the size of the icon in the widget zone may be changed correspondingly. This will be described with reference to FIG. 16.

Figure 16:
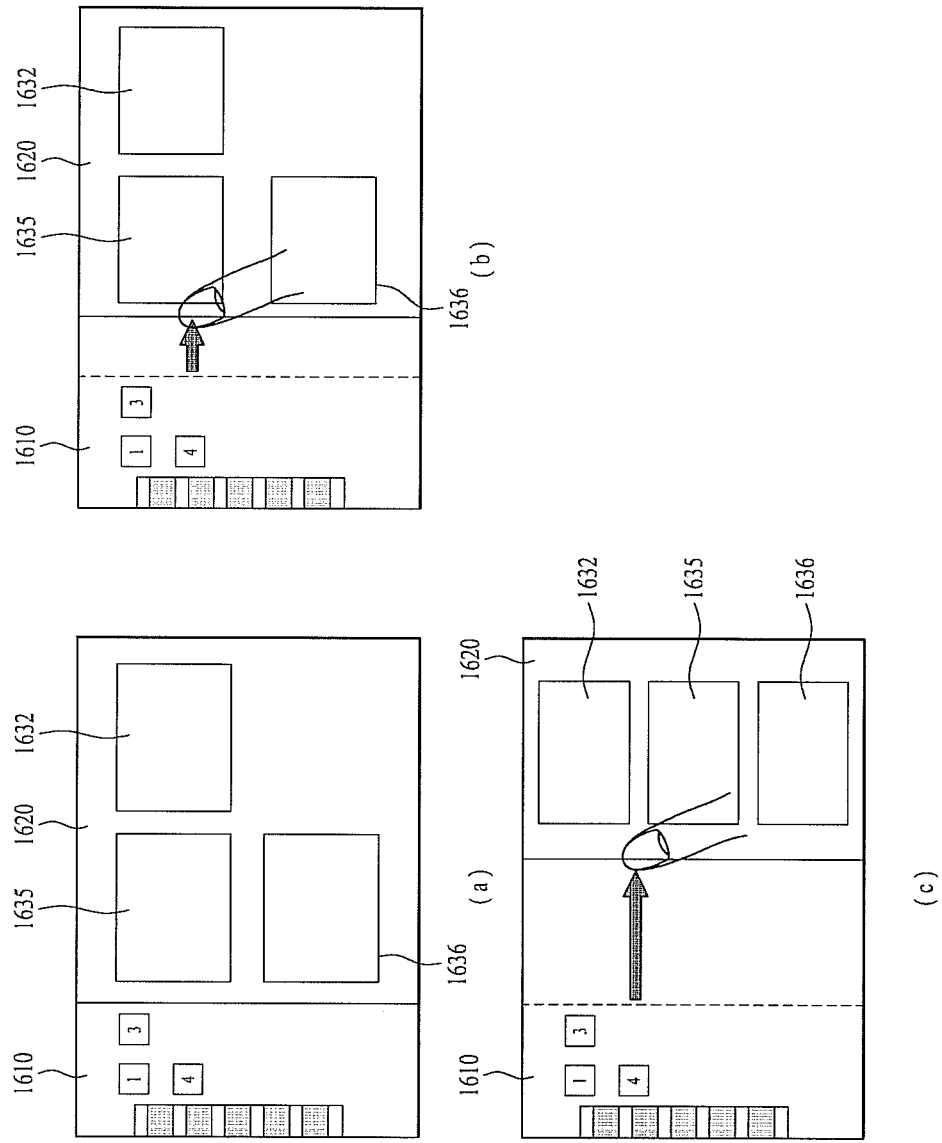
FIG. 16 illustrates a change in widget size depending on a size of an icon zone on a lens according to an embodiment as broadly described herein.

Referring to (a) of FIG. 16, first, third and fourth icons are arranged in an icon zone 1610 of the lens, and a widget 1632 corresponding to a second icon, a widget 1635 corresponding to a fifth icon and a widget 1636 corresponding to a sixth icon are arranged in a widget zone 1620.

As illustrated in (b) of FIG. 16, the icon zone 1610 may be extended to the widget zone 1620 by dragging the right end of the icon zone 1610 to a desired location. As the widget zone 1620 is by an amount corresponding to the extended icon zone 1610, the widgets 1632, 1635 and 1636 included in the reduced widget zone 1620 may be reduced to correspond to the reduced size of the widget zone 1620.

Also, as the icon zone 1610 is further extended than (b) of FIG. 16 to the widget zone 1620, as illustrated in (c) of FIG. 16, as the widget zone 1620 is reduced, the widgets 1632, 1635 and 1636 included in the reduced widget zone 1620 may be reduced to correspond to the reduced size of the widget zone 1620 and at the same time their arrangement within the widget zone 1620 may also be changed.

Hereinafter, additional functions that may be provided in a lens and a lens management menu will be described.

First, a widget locking function using a password setting will be described with reference to FIG. 17.

Figure 17:
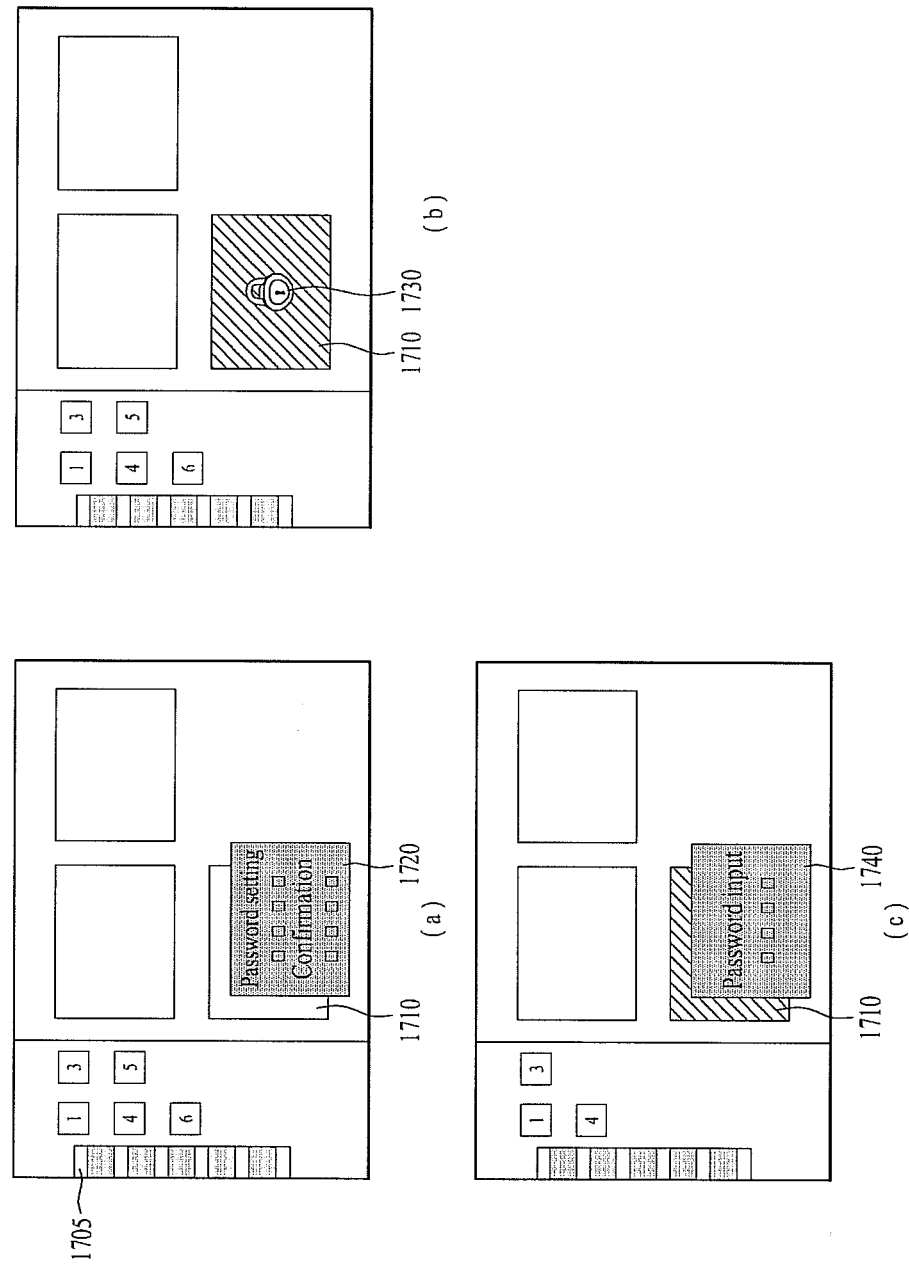
FIG. 17 illustrates an exemplary method of setting a password in a widget on a lens according to an embodiment as broadly described herein.

Referring to (a) of FIG. 17, a menu 1720 for setting a password is displayed in a widget 1710 arranged at the left lower end of a widget zone. This menu 1710 may be displayed as default when a corresponding widget is initially executed in the widget zone, or may be displayed through predetermined password setting menu manipulation. The password setting menu may be selected by the icon included in the global menu zone 1705, and may generally be applied to all the widgets.

In certain embodiments, the password may be input through a hardware keypad if the hardware keypad is provided in the user input module. In certain embodiments, a virtual keypad for inputting the password may be displayed on the touch screen.

If the password is set, an icon 1730 indicating a locking state may be displayed on the corresponding widget 1710 as illustrated in (b) of FIG. 17, and at least a part of the widget may not be displayed normally. In other words, before the locking state is released, the display state of the corresponding widget may be different from the state before locking.

If the widget 1710 for which a locking function has been set is selected by the user, a menu 1740 for inputting a password may be displayed as illustrated in (c) of FIG. 17. If the password is successfully input, the locking state is released, and the corresponding widget 1710 may be displayed again in the original form.

This locking function may be set once, or may be enabled in only a specific account if various accounts for users are set in the mobile terminal. In other words, in the latter case, the locking state is always released in the first user account, whereas the locking state is always set in the accounts of the other users except for the first user. Alternatively, even though the locking state of a specific widget is released once, the locking state may automatically be set beyond the lens in which the corresponding widget is displayed.

As another additional function, a name given to a thumbnail of a corresponding lens may be changed automatically in the lens management menu depending on the widget arranged in the execution zone of the lens or the icon arranged in the icon zone. For example, if a music play widget, a movie play widget, and an image display widget are included in one lens, a thumbnail name (or lens name) of the corresponding lens may be "multimedia".

As still another additional function, the lens may be changed automatically depending on the status. This means that a plurality of lenses exist, and a basic screen displayed initially when the display module is turned on after it is turned off or the power source is applied can be applied to one lens. For example, if the display module is turned on or the power source is applied initially in the morning, a lens, which includes a widget related to news, may be displayed. And, if the display module is turned on or the power source is applied initially in the afternoon, a lens, which includes a game widget, may be displayed.

As another additional function, if an event occurs while a specific lens is being displayed, the occurrence of the corresponding event may be disregarded, or the form of display/sound output based on the occurrence of the event may be changed. For example, if this function is set in a lens, which includes an e-book widget, the current screen may not be changed automatically to a screen for phone call or call bell sound may not be output even in case of a phone while the corresponding lens is being displayed.

Moreover, if a sensor (for example, gravity sensor), which can sense a tilt/arrangement direction of the mobile terminal, is provided, a zone constituting the lens or an arrangement form of an object may be changed depending on an arrangement direction (portrait direction or landscape direction) of the mobile terminal. For example, if an orientation of the mobile terminal is changed from a horizontal direction (landscape direction) to a vertical direction (portrait direction), the widget and icons may be arranged at a rotation angle of 90 degrees (or 270 degrees).

Also, according to one embodiment as broadly described herein, the aforementioned method may be implemented as a code, which may be read by a processor, in a medium where a program is recorded. Examples of the medium may include ROM, RAM, CD-ROM, magnetic tape, floppy disk, optical data memory, carrier wave (for example, transmission through Internet).

The aforementioned mobile terminal is not restricted by the configuration and method of the aforementioned embodiments. All or some of the aforementioned embodiments in combination may be configured selectively, whereby various modifications may be made in the embodiments.

A more convenient user interface for a mobile terminal is provided.

A control method and an apparatus for performing such a control method are provided, in which a form or arrangement state of a plurality of objects such as widgets may be changed by various inputs.

A mobile terminal as embodied and broadly described herein may include a display module for displaying at least one of a display unit, which includes first and second zones, each of the first and second zones including at least one execution zone where an application is executed; a user input module for inputting a command from a user; and a controller controlling icons, which correspond to each icon executed in the execution zone included in the second zone, to be generated in the second zone if the second zone is changed through a first input of the user input module to include a part of the at least one execution zone.

A control method of a mobile terminal in accordance with another embodiment as broadly described herein may include displaying at least one of a display unit, which includes first and second zones, on a display module, each of the first and second zones including at least one execution zone where an application is executed; extending a size of the second zone to the first zone to correspond to a first input through a user input module; and generating icons, which correspond to each of applications executed in an execution zone included in the second zone, in the second zone if a part of the at least one execution zone is included in the extended second zone.

Such a mobile terminal may provide a more convenient user interface.

In particular, a form or arrangement state of a plurality of widgets may be changed on the user interface to correspond to a command input of a user, and switching between icon and widget may be performed conveniently.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a display module having a display that displays images thereon, the display including a first zone and a second zone, the first zone including at least one execution zone in which at least one application is executed;
an input module configured to receive an external command; and
a controller configured to change a size of the second zone to include a portion of the at least one execution zone in response to a first input received at the input module, and to generate at least one icon corresponding to at least one application executed in the at least one execution zone in the second zone having the changed size.

2. The mobile terminal of claim 1, wherein the input module and the display module comprise a touch screen.

3. The mobile terminal of claim 1, wherein the controller is configured to eliminate an image of the at least one execution zone included in the second zone.

4. The mobile terminal of claim 3, wherein the first input comprises a touch and drag input initiated at a point within the second zone and extending in a direction of the first zone.

5. The mobile terminal of claim 1, wherein the display further comprises a third zone, the third zone including at least one menu, the at least one menu including a plurality of applications that are executable in the at least one execution zone of the first zone.

6. The mobile terminal of claim 1, wherein the second zone includes one or more icons, and wherein, if one of the one or more icons included in the second zone is selected and moved to the first zone by a second input received at the input module, the controller is configured to execute an application corresponding to the selected icon in a new execution zone of the first zone.

7. The mobile terminal of claim 1, wherein, if one of the at least one execution zone included in the first zone is selected by a third input received at the input module, the controller is configured to change the selected execution zone to an icon corresponding to an application executed at the selected execution zone.

8. The mobile terminal of claim 1, wherein the at least one application comprises a widget or gadget.

9. The mobile terminal of claim 1, wherein the display module comprises a plurality of displays, and wherein the controller is configured to control display of respective thumbnails of the plurality of displays in response to a fourth input received at the input module.

10. The mobile terminal of claim 9, wherein, if a distance between two thumbnails of the plurality of thumbnails is less than a predetermined distance based on a fifth input received at the input module, the controller is configured to incorporate the two thumbnails into one of the plurality of displays.

11. The mobile terminal of claim 9, wherein, if one of the plurality of thumbnails is selected by a sixth input received at the input module, the controller is configured to display the selected thumbnail as a full screen on the display module.

12. A method of controlling a mobile terminal, the method comprising:
displaying first and second zones on a touchscreen of the mobile terminal, the first zone including at least one execution zone in which at least one application is executed;
extending the second zone toward the first zone in response to a first touch input received via the touchscreen; and
generating at least one icon corresponding to each application displayed on a portion of the at least one execution zone covered by the extended second zone.

13. The method of claim 12, wherein the at least one application comprises a widget or gadget.

14. The method of claim 12, further comprising eliminating an image of the at least one execution zone that has been covered by the extended second zone.

15. The method of claim 12, further comprising:
selecting one of one or more icons displayed in the second zone in response to a second touch input received via the touchscreen;
moving the selected icon to the first zone in response to a third touch input received via the touchscreen; and
executing an application corresponding to the selected icon in a new execution zone of the first zone.

16. A method of operating a mobile terminal, the method comprising:
displaying a control screen on a display of the mobile terminal, the control screen including a first zone in which a plurality of execution items are displayed and a second zone in which a plurality of icons are displayed; and
executing a command corresponding to one of the plurality of execution items or one of the plurality of icons in response to an external input received on the control screen, comprising:
moving a selected icon from the second zone into the first zone and executing an application corresponding to the selected icon, in response to a first external input;

terminating execution of a selected execution item, moving the terminated execution item from the first zone into the second zone, and displaying an icon corresponding to the terminated execution item in the second zone, in response to a second external input; and expanding an area of the second zone to encompass a portion of the first zone, displaying one or more icons corresponding to one or more execution items displayed in the portion of the first zone encompassed by the expanded second zone, and eliminating the one or more execution items from the first zone, in response to a third external input.

17. The method of claim 16, wherein expanding an area of the second zone to encompass a portion of the first zone comprises:

receiving an initial touch at a point within the second zone;

maintaining the touch and dragging the touch in a direction of the first zone;

releasing the touch within the first zone; and expanding the area of the second zone to a point corresponding to the release of the touch.

18. The method of claim 17, wherein displaying one or more icons corresponding to one or more execution items displayed in the portion of the first zone encompassed by the expanded second zone comprises:

terminating execution of the one or more execution items included in the area encompassed by the expanded second zone;

generating and displaying one or more icons in the expanded second zone corresponding to the terminated one or more execution items, and eliminating display of the terminated one or more execution items from a remaining area of the first zone; and re-arranging execution items remaining in the remaining area of the second zone.

19. The method of claim 16, wherein executing a command corresponding to one of the plurality of execution items or one of the plurality of icons in response to an external input received on the control screen further comprises:

re-arranging or consolidating execution items displayed in the first zone in response to a fourth external input received within the first zone; and re-arranging or consolidating icons displayed in the second zone in response to a fifth external input received within the first zone.

20. The method of claim 16, wherein displaying a control screen on a display of the mobile terminal comprises displaying a control screen including the first zone, the second zone, a third zone in which a plurality of indicators are displayed, wherein the first zone is separate from the second zone, and the third zone is separate from the first and second zones, and wherein the first zone is expandable into the second zone, the second zone is expandable into the first zone.

* * * * *